United States Patent
Handa et al.

(10) Patent No.: US 10,673,306 B2
(45) Date of Patent: Jun. 2, 2020

(54) ROTARY MACHINE

(75) Inventors: Norihisa Handa, Tokyo (JP); Satoru Ohashi, Tokyo (JP); Masahiro Tanida, Tokyo (JP); Shusaku Yamasaki, Tokyo (JP)

(73) Assignee: IHI Corporation, Tokyo (JP)

( * ) Notice: Subject to any disclaimer, the term of this patent is extended or adjusted under 35 U.S.C. 154(b) by 1088 days.

(21) Appl. No.: 13/996,334

(22) PCT Filed: Apr. 22, 2011

(86) PCT No.: PCT/JP2011/059977
§ 371 (c)(1),
(2), (4) Date: Jun. 20, 2013

(87) PCT Pub. No.: WO2012/086227
PCT Pub. Date: Jun. 28, 2012

(65) Prior Publication Data
US 2013/0270931 A1 Oct. 17, 2013

(30) Foreign Application Priority Data

Dec. 22, 2010 (JP) .................................. 2010-286586
Mar. 25, 2011 (JP) .................................. 2011-068204

(51) Int. Cl.
*H02K 3/34* (2006.01)
*H02K 3/24* (2006.01)
(Continued)

(52) U.S. Cl.
CPC .............. *H02K 9/005* (2013.01); *H02K 1/32* (2013.01); *H02K 5/10* (2013.01); *H02K 5/20* (2013.01);
(Continued)

(58) Field of Classification Search
CPC .. H02K 5/10; H02K 9/00; H02K 1/32; H02K 5/20; H02K 9/005; H02K 9/197;
(Continued)

(56) References Cited

U.S. PATENT DOCUMENTS 2,615,068 A * 10/1952 Radice .................... H02K 5/132
 310/87
3,629,628 A * 12/1971 Rank ........................ H02K 9/19
 310/54

(Continued)

FOREIGN PATENT DOCUMENTS

CN           101755376 A       6/2010
DE   11 2008 001 200 T5     4/2010
(Continued)

OTHER PUBLICATIONS

JP2004180376 English Translation.*
(Continued)

*Primary Examiner* — Alfonso Perez Borroto
*Assistant Examiner* — Alexander Moraza
(74) *Attorney, Agent, or Firm* — Oblon, McClelland, Maier & Neustadt, L.L.P.

(57) ABSTRACT

A rotary machine capable of carrying out efficient cooling without increasing costs or deteriorating performance is provided. A motor 1 serving as the rotary machine has a rotor 20 configured to be rotatable around a rotary shaft 10, a stator 30 having a stator core 31 arranged around the rotor 20 and a coil 32 attached to the stator core 31 so that a coil end part 32a protrudes from each end of the stator core 31, mold members 33a and 33b formed at both ends of the stator core 31, to cover base parts of the coil end parts 32a, and partition parts 42b and 43b attached in contact with the mold (Continued)

members 33a and 33b, to separate a space S1 in which the rotor 20 is arranged from a space S2 in which the coil end parts 32a are arranged.

13 Claims, 14 Drawing Sheets

(51) Int. Cl.
*H02K 9/197* (2006.01)
*H02K 9/00* (2006.01)
*H02K 1/32* (2006.01)
*H02K 5/20* (2006.01)
*H02K 5/10* (2006.01)
*H02K 9/22* (2006.01)
*H02K 3/48* (2006.01)

(52) U.S. Cl.
CPC ............... *H02K 9/197* (2013.01); *H02K 3/24* (2013.01); *H02K 3/34* (2013.01); *H02K 3/345* (2013.01); *H02K 3/48* (2013.01); *H02K 9/22* (2013.01)

(58) Field of Classification Search
CPC .......... H02K 15/12; H02K 3/24; H02K 15/04; H02K 9/19; H02K 9/0005; H02K 1/27; H02K 5/128; H02K 5/1282; H02K 5/1285; H02K 2005/1287; H02K 3/34; H02K 3/345
USPC ... 310/52, 60, 60 A, 65, 54, 57, 58, 156, 85, 310/86, 214, 215, 194
See application file for complete search history.

(56) References Cited

U.S. PATENT DOCUMENTS

| | | | |
|---|---|---|---|
| 4,227,108 A | 10/1980 | Washizu et al. | |
| 4,311,932 A | 1/1982 | Olson | |
| 5,746,961 A * | 5/1998 | Stevenson | B05D 7/02 106/218 |
| 6,365,998 B1 * | 4/2002 | Kech | H02K 3/47 310/194 |
| 8,928,195 B2 | 1/2015 | Ohashi | |
| 2002/0195887 A1 | 12/2002 | Kobayashi et al. | |
| 2003/0030333 A1 | 2/2003 | Johnsen | |
| 2003/0042817 A1 * | 3/2003 | Tsuneyoshi | H02K 9/197 310/216.014 |
| 2003/0062780 A1 * | 4/2003 | Kaneko | H02K 1/20 310/58 |
| 2003/0075996 A1 | 4/2003 | Yoshida et al. | |
| 2006/0119196 A1 | 6/2006 | Konishi et al. | |
| 2009/0302694 A1 * | 12/2009 | Asai | H02K 3/325 310/45 |
| 2010/0019589 A1 | 1/2010 | Saban et al. | |
| 2010/0052441 A1 * | 3/2010 | Fukushima | H02K 9/19 310/54 |
| 2010/0194220 A1 | 8/2010 | Tatematsu et al. | |
| 2010/0275436 A1 * | 11/2010 | Kiyono | H02K 15/12 29/596 |
| 2012/0007453 A1 * | 1/2012 | Leiber et al. | 310/43 |

FOREIGN PATENT DOCUMENTS

| | | | |
|---|---|---|---|
| EP | 0 980 132 A1 | 2/2000 | |
| EP | 1 199 787 A1 | 4/2002 | |
| EP | 1 300 924 A2 | 4/2003 | |
| EP | 1 841 046 A1 | 10/2007 | |
| EP | 1 953 896 A1 | 8/2008 | |
| JP | 9-163682 A | 6/1997 | |
| JP | 2716286 | 2/1998 | |
| JP | 2002 325394 | 11/2002 | |
| JP | 2002 345188 | 11/2002 | |
| JP | 2002325394 A * | 11/2002 | |
| JP | 2003-224945 A | 8/2003 | |
| JP | 2003224945 A * | 8/2003 | |
| JP | 2003 289650 | 10/2003 | |
| JP | 2003289650 A * | 10/2003 | |
| JP | 2004-48939 A | 2/2004 | |
| JP | 2004 180376 | 6/2004 | |
| JP | 2004180376 A * | 6/2004 | |
| JP | 2005 328689 | 11/2005 | |
| JP | 2005328689 A * | 11/2005 | |
| JP | 2005-354821 A | 12/2005 | |
| JP | 2006 197774 | 7/2006 | |
| JP | 2009 27837 | 2/2009 | |
| JP | 2009027837 A * | 2/2009 | |
| JP | 4469670 | 5/2010 | |
| JP | 2010-130794 A | 6/2010 | |
| JP | 2010 213413 | 9/2010 | |
| JP | 2010 220340 | 9/2010 | |
| JP | 2010 226903 | 10/2010 | |
| JP | 2010226903 A * | 10/2010 | |
| JP | 2010 252544 | 11/2010 | |
| WO | WO-2010099975 A2 * | 9/2010 | H02K 1/18 |

OTHER PUBLICATIONS

JP2010226903 English Translation.*
JP2002325394 English Translation.*
JP2005328689 English Translation.*
JP2009027837 English Translation.*
JP 2003289650 A (English Translation).*
JP-2003224945-A (English Translation) (Year: 2003).*
WO-2010099975-A2 (English Translation) (Year: 2010).*
International Search Report dated Jul. 19, 2011 in PCT/JP11/59977 Filed Apr. 22, 2011.
Japanese Office Action dated Jan. 20, 2015 in Patent Application No. 2012-549649 (with English Translation).
Combined Chinese Office Action and Search Report dated Jan. 4, 2015 in Patent Application No. 201180061390.8 (with English translation of categories of cited documents).
Office Action dated Jun. 3, 2014, in Japanese Patent Application No. 2012-549649 with English translation.
Office Action dated Jun. 3, 2014, in Japanese Patent Application No. 2012-549650 with English translation.
Extended European Search Report dated May 27, 2016 in European Patent Application No. 11850801.9.
Extended European Search Report dated May 23, 2016 in EP Application No. 11 77 2115, No. of pp. 14.
European Search Report issued in Application No. 11850801.9 dated Jan. 29, 2016.
European Search Report issued in Application No. 11772115.9 dated Jan. 29, 2016.
European Search Report issued in Application No. 11851752.3 dated Mar. 2, 2016.
European Office Action issued in European Patent Application No. 11 851 752.3 dated Aug. 24, 2018.
European Office Action issued in Patent Application No. 11 851 752.3 dated Mar. 9, 2017.

* cited by examiner

FIG. 5
(a)
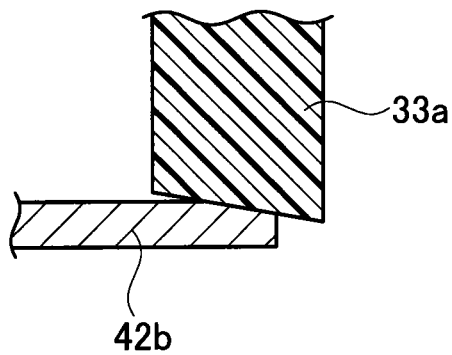
(b)
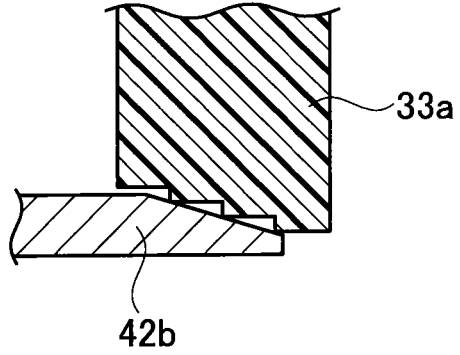
(c)
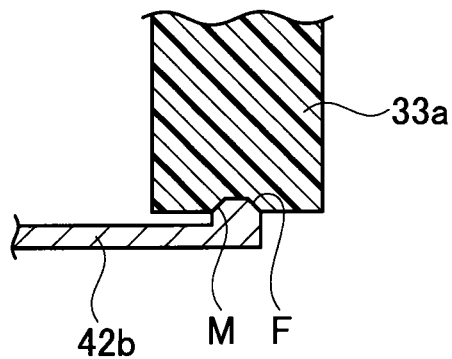
(d)
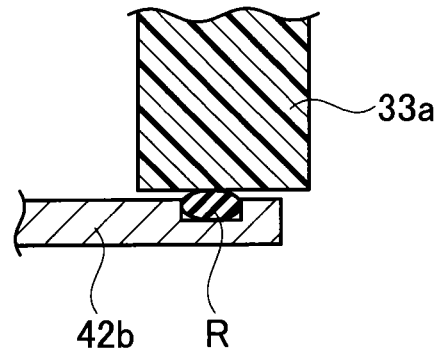
(e)
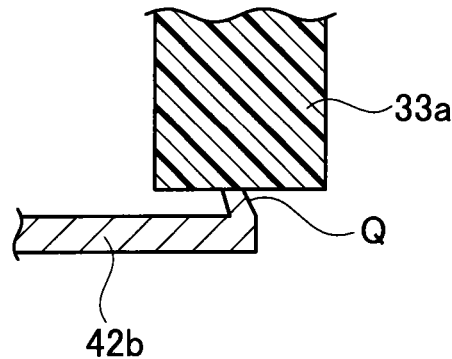
(f)
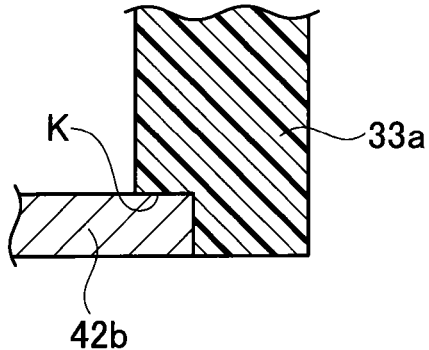

FIG. 11
(a) 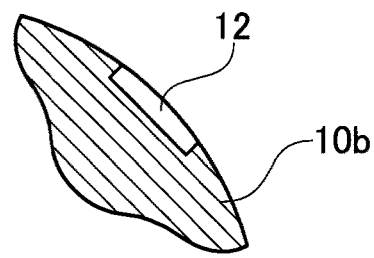
(b) 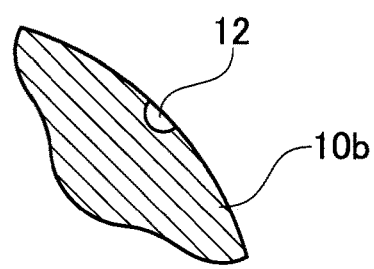
(c) 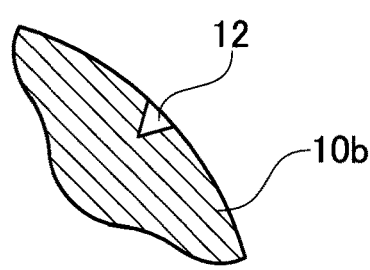
(d) 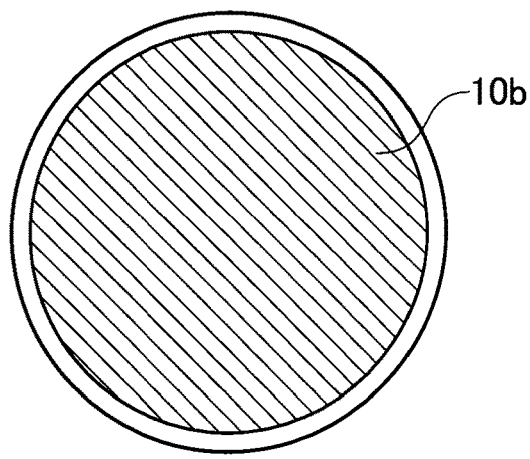

ROTARY MACHINE

TECHNICAL FIELD

The present invention relates to a rotary machine employing a coolant to cool a motor.

BACKGROUND ART

Cooling a rotary machine used for an electric vehicle and the like with the use of a coolant is useful to efficiently generate driving force (torque) by use of electric power. As an example of such a cooling technique for a rotary machine, there is a cooling technique of directly pouring a coolant onto a coil end part of a coil arranged in a stator. When cooling the coil end part, it is preferable to prevent the coolant from entering a gap (an air gap) between the stator and a rotor. Preventing the coolant from entering the air gap results in preventing an increase in a mechanical loss of the rotary machine. Related arts are disclosed in Japanese Patent Publication No. 2716286 and Japanese Unexamined Patent Application Publication No. 2010-213413.

CITATION LIST

Patent Literature

Patent Literature 1: Japanese Patent Publication No. 2716286
Patent Literature 2: Japanese Unexamined Patent Application Publication No. 2010-213413

SUMMARY OF INVENTION

Problem to be Solved by Invention

In connection with using a coolant to cool a coil end part of a stator of a rotary machine, the present inventors have studied the structural details of the rotary machine to further improve cooling efficiency. During the studying process, it has been found that further suppressing a mechanical loss of the rotary machine has a room for improvement in connection with the structure for cooling the coil end part with a coolant. The present invention has been made in consideration of this issue and an object of the present invention is to provide a rotary machine that converts electric power into torque, or torque into electric power at higher efficiency.

Means to Solve Problem

An aspect of the present invention provides a rotary machine including: a rotor configured to be rotatable around a center axis of a rotor shaft; a stator having a stator core arranged around the rotor and a coil attached to the stator core so that a coil end part protrudes from each end of the stator core; a mold member formed at each end of the stator core, to cover a base part of the coil end part; and a partition member attached in contact with the mold member, to separate a first space in which the rotor is arranged from a second space in which the coil end part is arranged.

Effect of Invention

According to the rotary machine of the present invention, the mold member is formed at each end of the stator core, to cover the base part of the coil end part and the partition member is attached in contact with the mold member, to separate the first space in which the rotor is arranged from the second space in which the coil end part is arranged. Accordingly, there is provided an effect of realizing efficient cooling without increasing costs or deteriorating performance.

BRIEF DESCRIPTION OF DRAWINGS

FIG. 5 is a view illustrating sealing methods for a partition member according to the first embodiment of the present invention.
FIG. 11 is a view illustrating sectional shapes of grooves formed on the rotary shaft of the motor, i.e., the rotary machine according to the fourth embodiment of the present invention.

MODE OF IMPLEMENTING INVENTION

Rotary machines according to embodiments of the present invention will be explained in detail with reference to the drawings. In the embodiments mentioned below, the rotary machines each are, as an example, a motor (an electric motor) driven and rotated with an externally supplied current (such as a three-phase AC current).

First Embodiment

Figure 1:
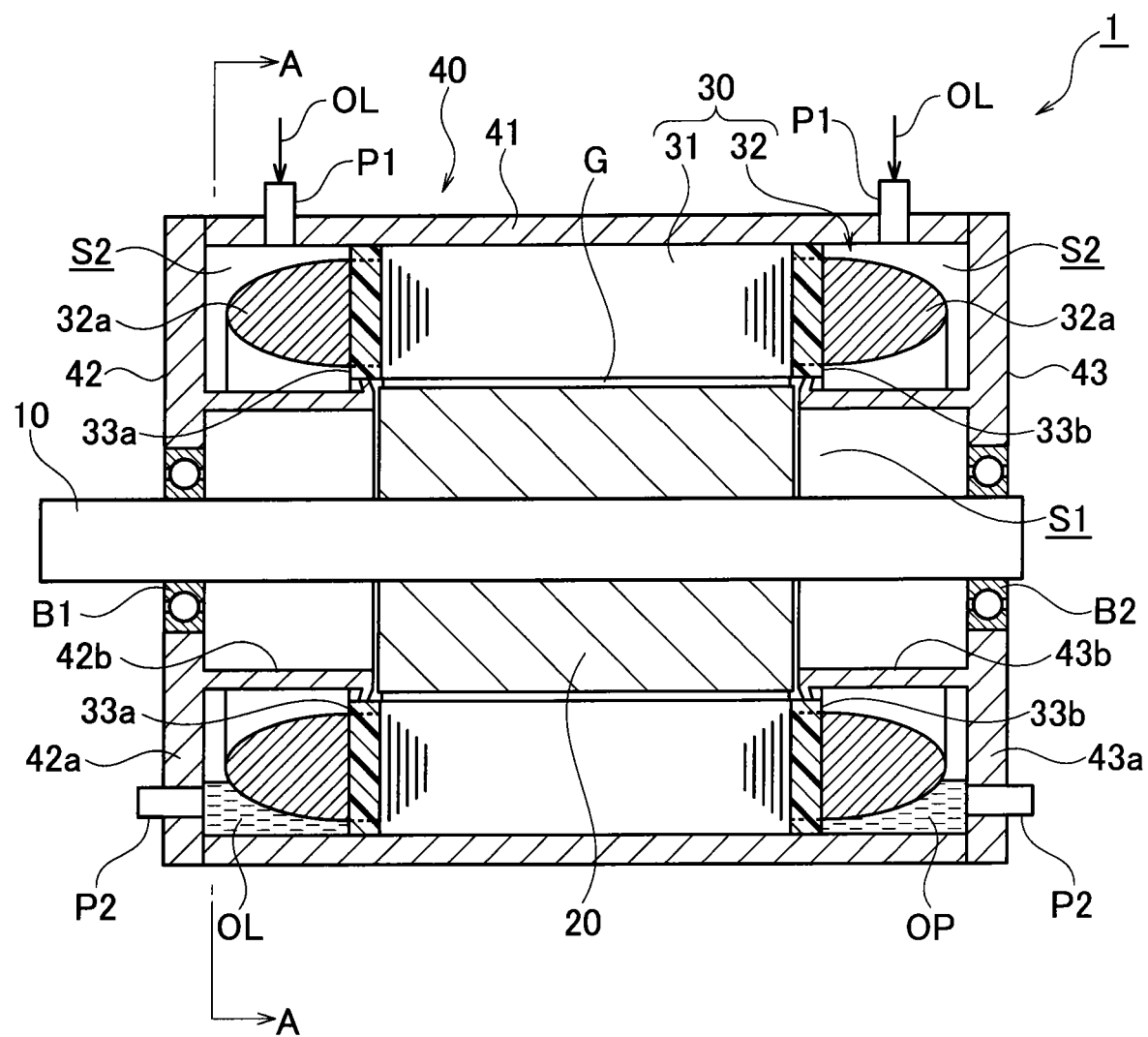
FIG. 1 is a sectional side view illustrating the structure of a motor, i.e., a rotary machine according to a first embodiment of the present invention.

FIG. 1 is a sectional side view illustrating the structure of a motor, i.e., a rotary machine according to the first embodiment of the present invention. As illustrated in FIG. 1, the motor 1 has a rotary shaft (rotor shaft) 10, a rotor (rotator) 20, a stator (stationary element) 30, and a housing 40. An externally supplied current creates electromagnetic force between the rotor 20 and the stator 30, to rotate the rotor 20, thereby rotationally driving the rotary shaft 10. In the following explanation, a left-right direction of FIG. 1 in which the rotary shaft 10 extends is referred to as "axial direction".

The rotary shaft 10 is a shaft member to transmit torque of the rotor 20 to the outside. The rotary shaft 10 is inserted in and fixed to the rotor 20 and is freely rotatably supported with bearings B1 and B2 arranged in the housing 40. Accordingly, the rotary shaft 10 and rotor 20 integrally rotate around a rotation axis of the rotary shaft 10. The bearings B1 and B2 are, for example, antifriction bearings such as angular ball bearings.

The rotor 20 is attached to the rotary shaft 10 and is rotatable around the rotary shaft 10. More precisely, the rotor 20 has a rotor core, permanent magnets, and end plates. The rotor core is made by laminating magnetic steel sheets made of magnetic material and is an annular member with the above-mentioned rotary shaft 10 being passed through the same. The permanent magnet is, for example, a rectangular parallelepiped magnet extending in the axial direction. A plurality of the permanent magnets are embedded in the rotor core on the stator 30 side at regular intervals along an outer circumference of the rotor core. This creates alternating magnetic fields along the outer circumference of the rotor core. The end plate is a disk-shaped member arranged at each axial end (in the laminated direction of the magnetic steel sheets) of the rotor core, to sandwich the rotor core in the axial direction.

Figure 2:
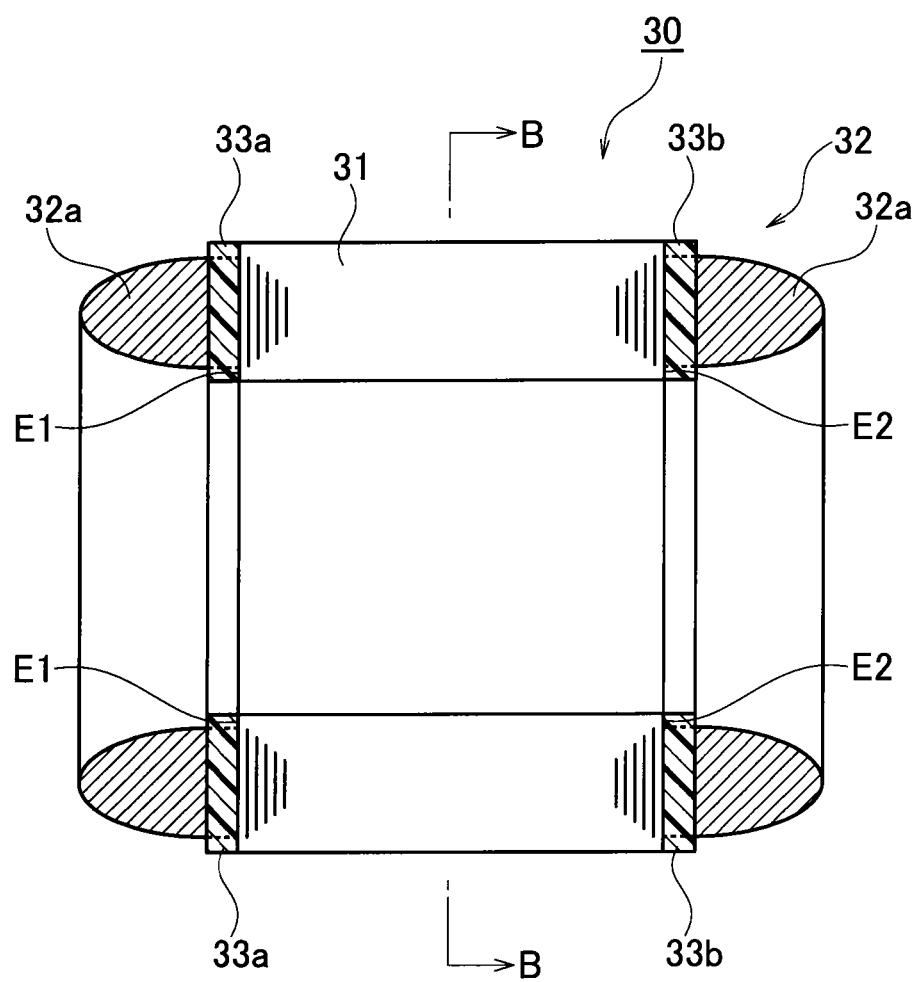
FIG. 2 is a sectional side view illustrating a stator extracted from the rotary machine according to the first embodiment of the present invention.
Figure 3:
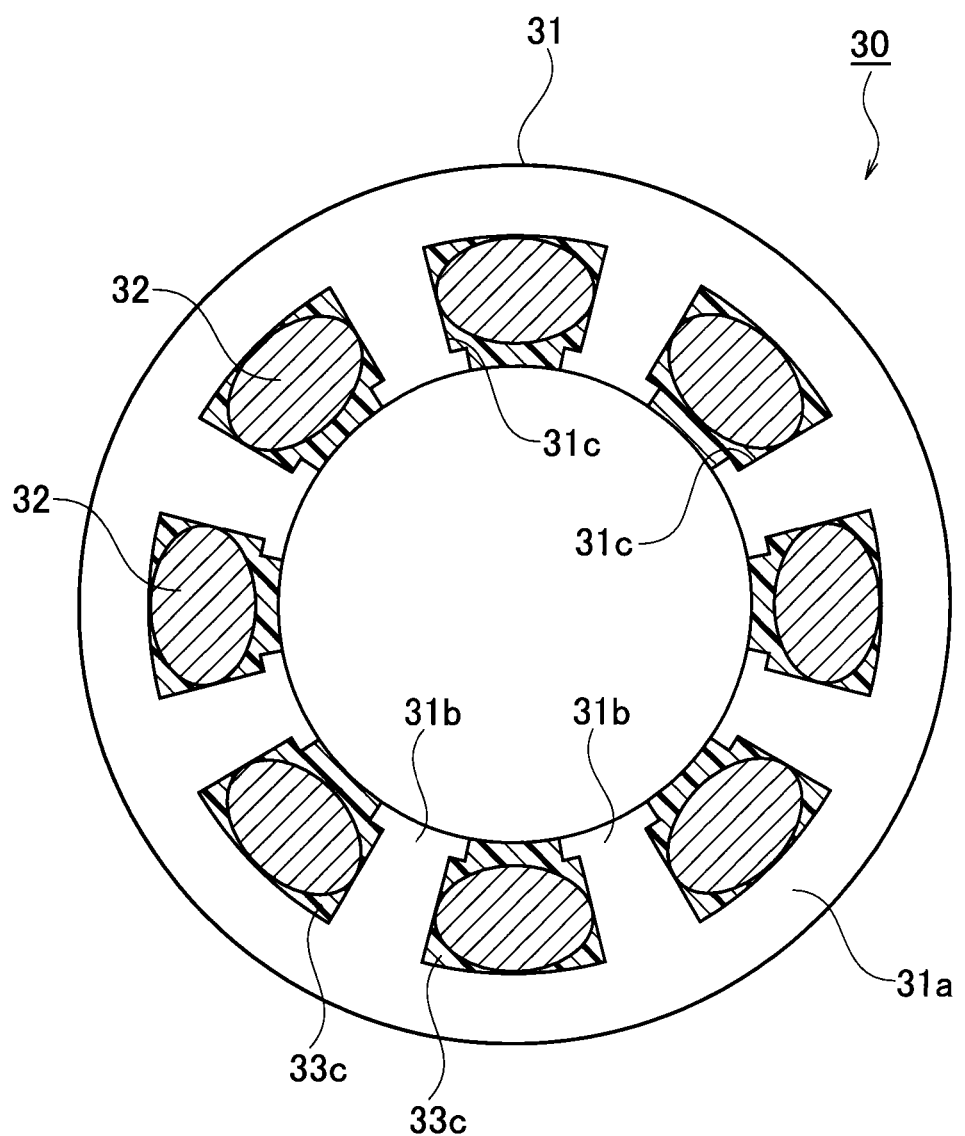
FIG. 3 is a sectional view taken along a line B-B of FIG. 2 and as seen from an arrowed direction.

The stator 30 has a stator core 31 and a coil 32 and is fixed to an inner circumferential face of a body member 41 that forms a part of the housing 40, to surround the rotor 20 in the rotation direction of the rotary shaft 10. According to a current externally supplied to the coil 32, a rotating magnetic field is formed in the outer circumferential direction of the rotor 20. FIG. 2 is a sectional side view illustrating the stator extracted from the rotary machine according to the first embodiment of the present invention. FIG. 3 is a sectional view taken along a line B-B of FIG. 2 and seen from an arrowed direction.

As illustrated in FIGS. 2 and 3, the stator core 31 of the stator 30 is, like the rotor core of the rotor 20 mentioned above, an annular member formed by laminating a plurality of magnetic steel sheets made of magnetic material. On an inner circumferential side of the stator core 31, the rotor 20 is arranged. An inner diameter of the stator core 31 is so set to form an annular gap (an air gap G illustrated in FIG. 1) having preset dimensions between the inner circumferential face of the stator core 31 and the outer circumferential face of the rotor 20.

More precisely, the stator core 31 has, as illustrated in FIG. 3, an annular yoke 31*a* and teeth 31*b* that are arranged in a circumferential direction of the yoke 31*a* and protrude toward a center axis of the yoke 31*a*. A clearance between the adjacent teeth 31*b* is a slot 31*c* in which the coil 32 is inserted. To avoid complication, FIG. 3 illustrates the stator core 31 having eight teeth 31*b* and eight slots 31*c*. These numbers may optionally be set.

The teeth 31*b* of the stator core 31 function as magnetic poles when three-phase AC is supplied to the coil 32 in the slots 31*c*. The stator core 31 is arranged around the rotor 20 so that the teeth 31*b* protrude toward the rotation axis of the rotary shaft 10. In this arrangement, a protrusion amount of the teeth 31*b* is set so that a gap between the teeth 31*b* and the rotor core forms the above-mentioned air gap G.

The coil 32 is inserted in the slots 31*c* formed in the stator core 31, to create magnetic poles according to an externally supplied current. The coil 32 includes a first coil to which a U-phase current of three-phase AC is supplied, a second coil to which a V-phase current is supplied, and a third coil to which a W-phase current is supplied. These first to third coils are sequentially arranged in the circumferential direction of the stator core 31. When a three-phase AC current is supplied to the coil 32, a rotating magnetic field is created along the inner circumferential face of the stator core 31.

The coil 32 is attached to the stator core 31 so that coil end parts 32*a* protrude from each end of the stator core 31. Namely, as illustrated in FIG. 2, the coil end parts 32*a* leftward protrude from a left end E1 of the stator core 31 and the coil end parts 32*a* protrude from a right end E2 of the stator core 31. Every coil 32 is attached to the stator core 31 as mentioned above, and therefore, the coil end parts 32*a* are circularly arranged along the ends E1 and E2 of the stator core 31 as illustrated in FIG. 2.

The ends E1 and E2 of the stator core 31 are provided with annular mold members 33*a* and 33*b* that extend along the ends E1 and E2 to cover base parts of the coil end parts 32*a*. The reason why the mold members 33*a* and 33*b* cover only the base parts of the coil end parts 32*a* instead of entirely covering the coil end parts 32*a* is to realize cooling with cooling oil OL and prevent the cooling oil from entering the air gap G between the rotor 20 and the stator 30.

Namely, covering only the base parts of the coil end parts 32*a* with the mold members 33*a* and 33*b* and exposing the remaining parts thereof realize that the cooling oil OL is directly poured onto the exposed parts of the coil end parts 32*a*, to efficiently cool the stator 30 (coil 32). As will be explained later in detail, front ends of partition parts 42*b* and 43*b* that partly form left sidewall member 42 and right sidewall member 43 of the housing 40 are sealed with the mold members 33*a* and 33*b*, to separate a space S1 (first space) in which the rotor 20 is arranged from a space S2 (second space) in which the coil end parts 32*a* are arranged, thereby preventing the oil from entering the air gap G.

The thickness of the mold members 33*a* and 33*b* is determined in consideration of a sealing degree and cooling efficiency. If the front ends of the partition parts 42*b* and 43*b* are not sealed, the oil will enter the air gap G. Accordingly, the thickness of the mold members 33*a* and 33*b* must be sufficient to seal at least the front ends of the partition parts 42*b* and 43*b*. As the thickness of the mold members 33*a* and 33*b* increases, the exposed part of each coil end part 32*a* reduces to lower the cooling efficiency with oil. Accordingly, the thickness of the mold members 33*a* and 33*b* must be smaller than a thickness capable of securing a necessary cooling efficiency. The thickness of the mold members 33*a* and 33*b* is, for example, about 50% of the protruding amount of the coil end part 32*a*, preferably, about 20 to 30% of the protruding amount of the coil end part 32*a*.

As illustrated in FIG. 3, the inside of the stator core 31 is provided with a mold member 33*c*, which is similar to the mold members 33*a* and 33*b*, to bury an inner gap of each slot 31*c* formed in the stator core 31. The mold member 33*c* is arranged to fix the coil 32 inserted in the slot 31*c* so as to prevent the coil 32 from vibrating in the slot 31*c* and improve the cooling efficiency of the coil 32.

When a current is applied, the coil 32 becomes a heat generating source, and therefore, the mold members 33*a* and 33*b* covering the base parts of the coil end parts 32*a* and the mold member 33*c* fixing each coil 32 in each slot 31*c* are required to have a high thermal conductivity. It is preferable to form the mold members 33*a*, 33*b*, and 33*c* with thermally conductive resin mixed with thermally conductive fillers having an insulating characteristic, such as silicon oxide (SiO2) and aluminum oxide (Al2O3).

The mold members 33a and 33b and the mold member 33c may be made of material having the same thermal conductivity, or materials having different thermal conductivities. Each coil 32 attached to the stator core 31 has a higher wire concentration (wires that form the coil 32) at part inserted in the slot 31c and a front end of the coil end part 32a and a lower wire concentration at the base of the coil end part 32a. Heat resistance is higher at the part where the wire concentration is low (the base part of the coil end part 32a) than at the part where the wire concentration is high (the inside of the slot 31c and the front end of the coil end part 32a). Accordingly, it is preferable to form the mold members 33a and 33b with a material whose thermal conductivity is higher than that of a material used to form the mold member 33c.

In connection with the mold members 33a and 33b formed at the ends E1 and E2 of the stator core 31, a viscosity at the time of forming the mold members may be given priority to a thermal conductivity after the formation of the mold members. In this case, the mold members 33a and 33b may be formed with a material that has a lower thermal conductivity and viscosity than those of a material used to form the mold member 33c. Such a material is required when the material for the mold member 33c is insufficient to fill gaps at the base part of each coil end part 32a (gaps among the wires that form the coil 32).

In consideration of a functional difference between the mold members 33a and 33b and the mold member 33c, the mold members 33a and 33b and the mold member 33c may be formed from different materials. The mold members 33a and 33b are also used to seal the front ends of the partition parts 42b and 43b, and therefore, they may be formed with a material having resiliency after the material hardens. On the other hand, the mold member 33c must surely fix the coil 32 in each slot 31c, and therefore, it may be formed from a material that increases hardness after the material hardens.

The housing 40 includes the body member 41, left sidewall member 42, and right sidewall member 43, accommodates the rotary shaft 10 partly, the rotor 20, and the stator 30, and forms an external shape of the motor 1. The body member 41 is made of iron alloy and the like and is a cylindrical member with each axial end being open. The above-mentioned stator 30 is fixed on the inner circumferential face of the body member 41.

At an upper part of the body member 41 in a vertical direction, an oil supply port (coolant supply port) P1 is arranged to guide externally supplied cooling oil OL to the coil end parts 32a arranged inside the housing 40. The oil supply port P1 is arranged at a plurality of locations in the rotation direction of the rotary shaft 10 above an exposed part (a part not covered with the mold member 33a) of each coil end part 32a leftward protruding from the end E1 of the stator core 31 and above an exposed part (a part not covered with the mold member 33b) of each coil end part 32a rightward protruding from the end E2 of the stator core 31.

Figure 4:
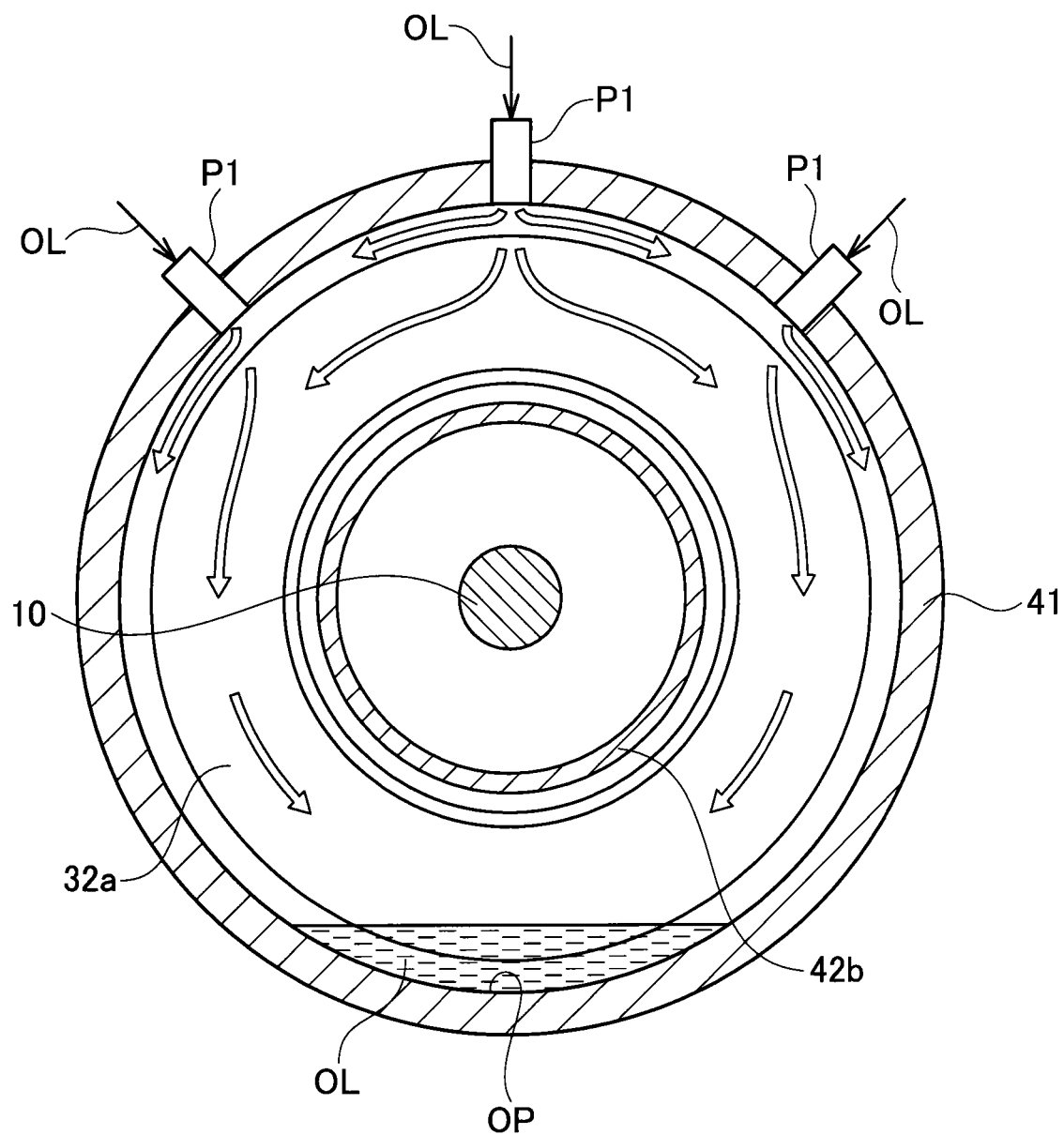
FIG. 4 is a sectional view taken along a line A-A of FIG. 1 and as seen from an arrowed direction.

FIG. 4 is a sectional view taken along a line A-A of FIG. 1 and seen in an arrowed direction. As illustrated in FIG. 4, the oil supply ports P1 are arranged above the exposed parts of the coil end parts 32a at three locations in the rotation direction of the rotary shaft 10. The oil supply ports P1 are arranged at intervals of, for example, 20 to 70° in the rotation direction of the rotary shaft 10. Oil OL supplied from the oil supply ports P1 drops on different parts of the coil end parts 32a and flows downward along the exposed parts of the coil end parts 32a as indicated with arrows in FIG. 4. The bottom of the body member 41 is an oil pool OP where the oil OL downwardly moved along the exposed parts of the coil end parts 32a is temporarily kept.

Compared with dropping the oil OL only from one oil supply port P1, arranging the oil supply ports P1 at three locations in the rotation direction of the rotary shaft 10 and dropping the oil OL from these oil supply ports P1 are able to spread the oil OL over the whole of the exposed parts of the coil end parts 32a, thereby improving cooling efficiency. Although the example illustrated in FIG. 4 forms the oil supply ports P1 at three locations in the rotation direction of the rotary shaft 10, the oil supply ports P1 may be formed at two locations or more than four locations in the rotation direction of the rotary shaft 10 according to the size of the motor and the like. It is not always necessary to linearly arrange the oil supply ports P1 in the rotation direction of the rotary shaft 10. They may be axially shifted from one another.

The left sidewall member 42 has a disk-shaped bottom plate part 42a and the cylindrical partition part (partition member) 42b. In the left sidewall member 42, the bottom plate part 42a is attached to a left end of the body member 41 so that the partition part 42b is arranged inside the body member 41. The bottom plate part 42a that forms part of the left sidewall member 42 has, at a central part thereof, a hole to fit the bearing B1. At an outer peripheral part of the bottom plate part 42a, an oil discharge port P2 is arranged to discharge the oil OL from the oil pool OP to the outside.

The partition part 42b that forms part of the left sidewall member 42 has an outer diameter substantially equal to an inner diameter of the stator core 31 (the mold member 33a). A front end of the partition part 42b is in contact with the mold member 33a, to separate the space S1 in which the rotor 20 is arranged from the space S2 in which the coil end parts 32a are arranged on the left side of the stator core 31. Namely, the front end of the partition part 42b is sealed with the mold member 33a, to separate the spaces S1 and S2 from each other.

Similar to the left sidewall member 42, the right sidewall member 43 has a disk-shaped bottom plate part 43a and the cylindrical partition part (partition member) 43b. In the right sidewall member 43, the bottom plate part 43a is attached to a right end of the body member 41 so that the partition part 43b is arranged inside the body member 41. The bottom plate part 43a that forms part of the right sidewall member 43 has, at a central part thereof, a hole to fit the bearing B2. At an outer peripheral part of the bottom plate part 43a, an oil discharge port P2 is arranged to discharge the oil OL from the oil pool OP to the outside.

The partition part 43b that forms part of the right sidewall member 43 has an outer diameter substantially equal to the inner diameter of the stator core 31 (the mold member 33b). A front end of the partition part 43b is in contact with the mold member 33b, to separate the space S1 in which the rotor 20 is arranged from the space S2 in which the coil end parts 32a are arranged on the right side of the stator core 31. Namely, the front end of the partition part 43b is sealed with the mold member 33b, to separate the spaces S1 and S2 from each other.

FIG. 5 is a view illustrating sealing methods for the partition member according to the first embodiment of the present invention. As mentioned above, the partition parts 42b and 43b of the left sidewall member 42 and right sidewall member 43 are sealed with their front ends being in contact with the mold members 33a and 33b. There will be various methods (sealing methods) of bringing the front ends of the partition parts 42b and 43b in contact with the mold members 33a and 33b, as illustrated in FIG. 5. Methods of sealing the partition part 42b with the mold member 33a will be explained. These methods are also applicable to seal the partition part 43b with the mold member 33b.

The sealing method illustrated in FIG. 5(a) tapers an outer circumferential face of the front end of the partition part 42b and an inner circumferential face of the mold member 33a and wholly fits the front end of the partition part 42b to the inner circumferential face of the mold member 33a, thereby increasing a contact area between the partition part 42b and the mold member 33a. The sealing method illustrated in FIG. 5(b) tapers the outer circumferential face of the front end of the partition part 42b and forms steps in the inner circumferential face of the mold member 33a and wholly fits the front end of the partition part 42b to the inner circumferential face of the mold member 33a, thereby increasing contact locations between the partition part 42b and the mold member 33a.

The sealing method illustrated in FIG. 5(c) forms a flange F at the front end of the partition part 42b and a groove M in, the inner circumferential face of the mold member 33a and fits the whole of the flange F formed at the front end of the partition part 42b into the groove M formed in the inner circumferential face of the mold member 33a, thereby improving a sealing degree between the partition part 42b and the mold member 33a. The sealing method illustrated in FIG. 5(d) forms a groove at the front end of the partition part 42b, arranges an O-ring R in the groove, and brings the whole of the O-ring R arranged at the front end of the partition part 42b in contact with the inner circumferential face of the mold member 33a, thereby improving a sealing degree between the partition part 42b and the mold member 33a.

The sealing method illustrated in FIG. 5(e) forms a protrusion Q entirely along the outer circumferential face of the front end of the partition part 42b and wholly brings the protrusion Q in contact with the inner circumferential face of the mold member 33a, thereby improving a sealing degree between the partition part 42b and the mold member 33a. The sealing method illustrated in FIG. 5(f) forms a notch K in the inner circumferential face of the mold member 33a and wholly fits the front end of the partition part 42b into the notch K formed in the mold member 33a, thereby improving a sealing degree between the partition part 42b and the mold member 33a.

Operation of the motor 1 with the above-mentioned structure will briefly be explained. When an external three-phase AC current is supplied to the motor 1, each phase current of the three-phase AC current passes through the coil (first to third coils) arranged in the stator 30, to form a rotating magnetic field in the rotation direction of the rotor 20 according to the supplied current. The rotor core with alternating magnetic fields formed along the outer circumference thereof interacts with the rotating magnetic field, to create attractive force and repulsive force. This results in rotating the rotor 20 to rotate the rotary shaft 10 and rotor 20 together, thereby transmitting torque of the rotary shaft 10 to the outside.

When the motor 1 is driven, a pump or the like (not illustrated) supplies cooling oil OL to the oil supply ports P1 and the oil drops onto a plurality of locations of the exposed parts of the coil end parts 32a arranged in the space S2. The oil OL dropped on the coil end parts 32a downwardly moves along the exposed parts of the coil end parts 32a as indicated with arrows in FIG. 4. Since the oil OL drops onto the plurality of locations of the coil end parts 32a, the oil OL wholly spreads over the coil end parts 32a arranged along the ends of the stator core 31, thereby efficiently cooling the coil end parts 32a.

The partition part 42b of the left sidewall member 42 is sealed with the mold member 33a and the partition part 43b of the right sidewall member 43 is sealed with the mold member 33b, so that, on both the left and right sides of the stator core 31, the space S1 in which the rotor 20 is arranged is separated from the space S2 in which the coil end parts 32a are arranged. This prevents the oil OL supplied from the oil supply ports P1 into the space S2 from entering the air gap G.

As mentioned above, the present embodiment forms the mold members 33a and 33b at both ends of the stator core 31, respectively, to cover the base parts of the coil end parts 32a and arranges the partition parts 42b and 43b in contact with the mold members 33a and 33b, respectively, to separate the space S1 in which the rotor 20 is arranged from the space S2 in which the coil end parts 32a are arranged. This realizes efficient cooling without increasing costs or deteriorating performance.

Second Embodiment

Figure 6:
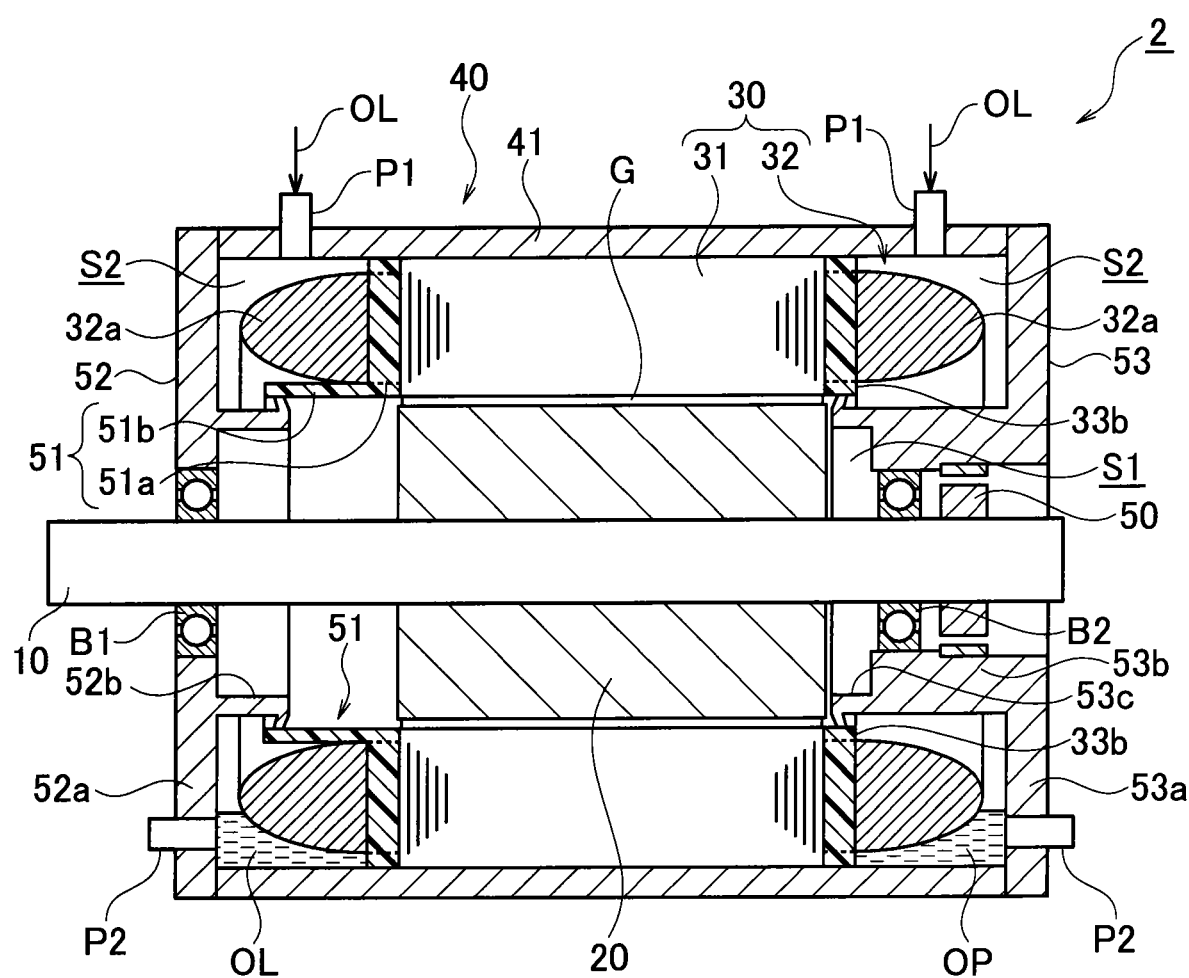
FIG. 6 is a sectional side view illustrating the structure of a motor, i.e., a rotary machine according to a second embodiment of the present invention.

FIG. 6 is a sectional side view illustrating the structure of a motor, i.e., a rotary machine according to the second embodiment of the present invention. The motor 2 of this embodiment illustrated in FIG. 6 differs from the motor 1 illustrated in FIG. 1 in that it attaches a resolver 50 to a rotary shaft 10, arranges a mold member 51 instead of the mold member 33a, and employs left sidewall member 52 and right sidewall member 53 instead of the left sidewall member 42 and right sidewall member 43.

The resolver 50 is a sensor to detect a rotation angle of the rotary shaft 10, and in the example illustrated in FIG. 6, is arranged on a right side of a bearing B2. The mold member 51 is formed to have an asymmetric shape with respect to a mold member 33b formed on a right side of a stator core 31 in connection with the axial direction of the rotary shaft 10. More precisely, the mold member 51 has an annular part 51a formed in an annular shape along an end (end E1) of the stator core 31 to cover base parts of coil end parts 32a and a cylindrical protrusion 51b leftward protruding from the annular part 51a. The annular part 51a has the same shape as the mold member 33a illustrated in FIG. 1.

Similar to the left sidewall member 42 illustrated in FIG. 1, the left sidewall member 52 is a member having a disk-shaped bottom plate part 52a and a cylindrical partition part (partition member) 52b. The partition part 52b of the left sidewall member 52 is shorter in the axial direction than the partition part 42b of the left sidewall member 42. This is because the above-mentioned mold member 51 has the cylindrical protrusion 51b leftward protruding from the annular part 51a, and therefore, the partition part 52b is able to be in contact with the mold member 51 without being extended up to the annular part 51a of the mold member 51.

The right sidewall member 53 has a disk-shaped bottom plate part 53a, a cylindrical support part 53b, and a cylindrical partition part (partition member) 53c. The support part 53b supports, with its inner circumferential face, part of the bearing B2 and resolver 50. The partition part 53c is similar to the partition part 43b illustrated in FIG. 1 but is shorter in the axial direction than the partition part 43b by the portion of the support part 53b. In this way, the motor 2 of this embodiment has the resolver 50, and for this, the mold members 33b and 51 have asymmetrical shapes and the left sidewall member 52 and right sidewall member 53 have asymmetrical shapes.

According to the present embodiment, the mold member 51 and mold member 33b are formed at ends of the stator core 31 to cover the base parts of the coil end parts 32a. The partition parts 52b and 53c are in contact with the mold members 51 and 33b, to separate a space S1 in which a rotor 20 is arranged from a space S2 in which the coil end parts 32a are arranged. Like the first embodiment, this embodiment is capable of carrying out efficient cooling without increasing costs or deteriorating performance.

Third Embodiment

Figure 7:
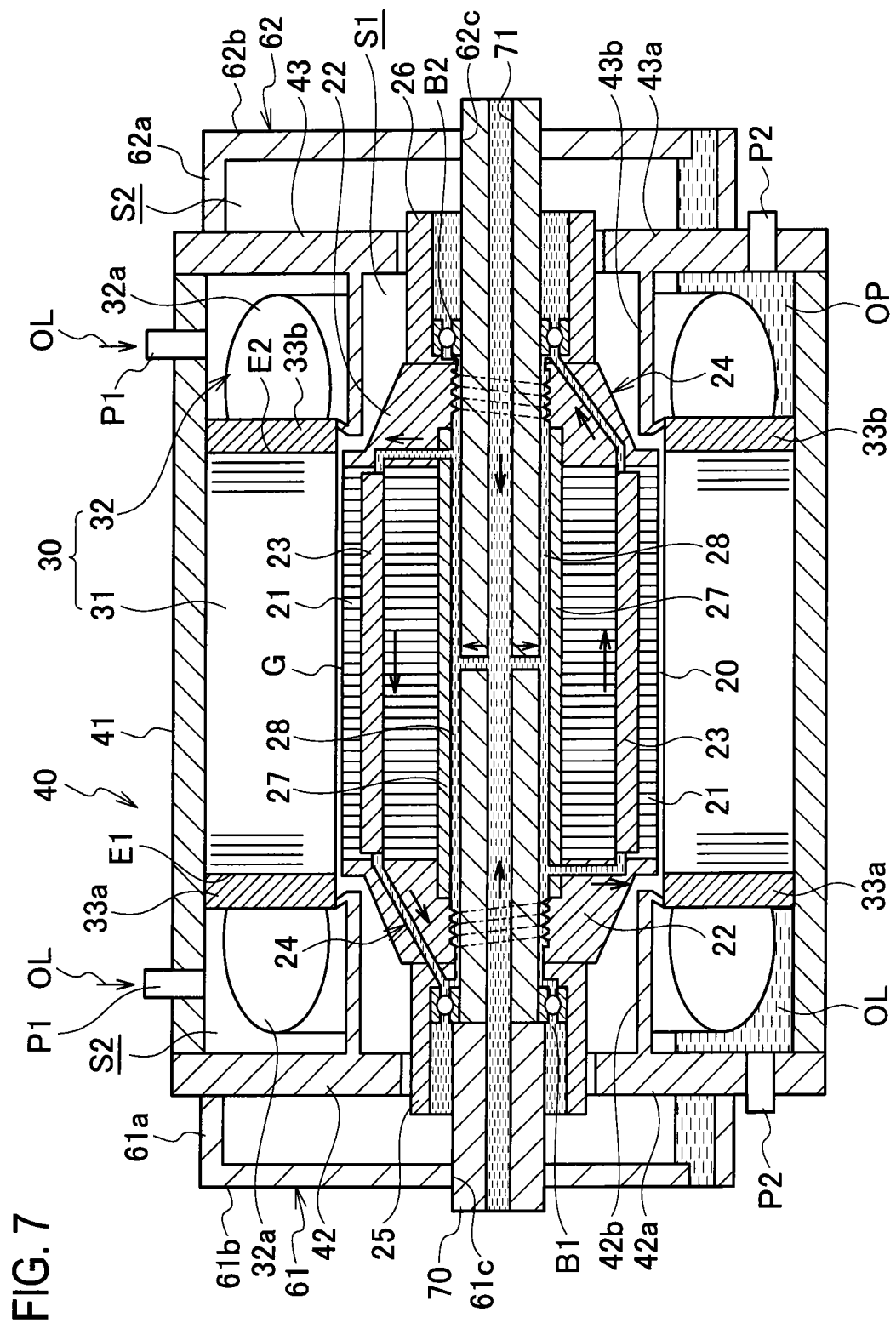
FIG. 7 is a sectional side view illustrating the structure of a motor, i.e., a rotary machine according to a third embodiment of the present invention.

FIG. 7 is a sectional side view illustrating the structure of a motor, i.e., a rotary machine according to the third embodiment of the present invention. The motors 1 and 2 of the first and second embodiments illustrated in FIGS. 1 to 6 are of an inner ring rotating type that turns the rotor 20 together with the rotary shaft 10. On the other hand, the motor 3 of the third embodiment illustrated in FIG. 7 is of an outer ring rotating type that turns a rotor 20 around a fixed center shaft 70.

The motor 3 of this embodiment attaches outer housings 61 and 62 to left and right outer sides of a housing 40 as illustrated in FIG. 7. The outer housings 61 and 62 fixedly support ends of the center shaft 70. With bearings B1 and B2, the center shaft 70 rotatably supports the rotor 20.

The rotor 20 of the motor 3 of this embodiment has a rotor core 21 made by laminating magnetic steel sheets made of magnetic material, an end ring 22 arranged at each axial side (in the laminated direction of the magnetic steel sheets) of the rotor core 21, and permanent magnets 23 buried in the rotor core 21 and elongated in the laminated direction of the magnetic steel sheets.

Inside the rotor 20, an oil flow path (coolant flow path) 24 is formed through the rotor core 21 and end rings 22, to run oil for cooling the rotor 20. The oil flow path 24 partly includes gaps between the rotor core 21 and the permanent magnets 23.

To each side of the end rings 22 in the axial direction of the center shaft 70, cylindrical rotary support members 25 and 26 are fixed. The rotary support members 25 and 26 are inserted with proper clearances into openings 42c and 43c formed in central parts of left and right sidewall members 42 and 43 of the housing 40. In this state, the rotary support members 25 and 26 outwardly protrude in the axial direction and are rotatably supported with the center shaft 70 through bearings B1 and B2. The rotary support members 25 and 26 are parts of the rotor 20.

The rotary support members 25 and 26 have paths to connect the oil flow path 24 and inner spaces of the bearings B1 and B2 to each other. These paths guide oil from the oil flow path 24 through the inner spaces of the bearings B1 and B2 to opened sides of the rotary support members 25 and 26.

The outer housing 61 that is on the left side of FIG. 7 to fixedly support a first end of the center shaft 70 has a body member 61a fixed to the left sidewall member 42 of the housing 40 and a left sidewall member 61b that closes a side of the body member 61a opposite to the housing 40. At the center of the left sidewall member 61b, a fitting hole 61c is formed to fix the outwardly protruding first end of the center shaft 70.

Similarly, an outer housing 62 to fixedly support a second end of the center shaft 70 as illustrated on the right side of FIG. 7 has a body member 62a fixed to the right sidewall member 43 of the housing 40 and a right sidewall member 62b that closes a side of the body member 62a opposite to the housing 40. At the center of the right sidewall member 62b, a fitting hole 62c is formed to fix the outwardly protruding second end of the center shaft 70.

Inside the center shaft 70, a rotor oil introducing flow path 71 is formed to open at each end of the center shaft 70. To the rotor oil introducing flow path 71, an oil supply unit such as an oil pump (not illustrated) supplies oil for cooling the rotor 20.

The rotor 20 has a center through hole into which the center shaft 70 is inserted. An inner wall of the center through hole is fixed to a cylindrical sleeve 27 that extends along the rotor core 21 and partly along the end rings 22 that are present on each axial side of the rotor core 21. Between the inner circumferential faces of the sleeve 27 and end rings 22 and an outer circumferential face of the center shaft 70, there is formed an annular gap (annular clearance) 28. The gap 28 communicates with the rotor oil introducing flow path 71 opened to the outer circumferential face of the center shaft 70 and the oil flow path 24 of the rotor 20.

Oil introduced to the rotor oil introducing flow path 71 is guided through the gap 28 into the oil flow path 24 of the rotor 20. The oil in the oil flow path 24 runs through the inner spaces of the bearings B1 and B2 to the openings of the rotary support members 25 and 26 and is discharged into spaces between the left sidewall member 42 and right sidewall member 43 of the housing 40 and the left sidewall member 61b and right sidewall member 62b of the outer housings 61 and 62.

According to the present embodiment, the motor 3 is of the outer ring rotating type with the rotor 20 rotating around the center shaft 70. Mold members 33a and 33b are formed at both ends of a stator core 31 to cover base parts of coil end parts 32a. Partition parts 42b and 43b are in contact with the mold members 33a and 33b, respectively, to separate a space S1 in which the rotor 20 is arranged from a space S2 in which the coil end parts 32a are arranged. Similar to the first embodiment, this embodiment is capable of carrying out efficient cooling without increasing costs or deteriorating performance.

Fourth Embodiment

Figure 8:
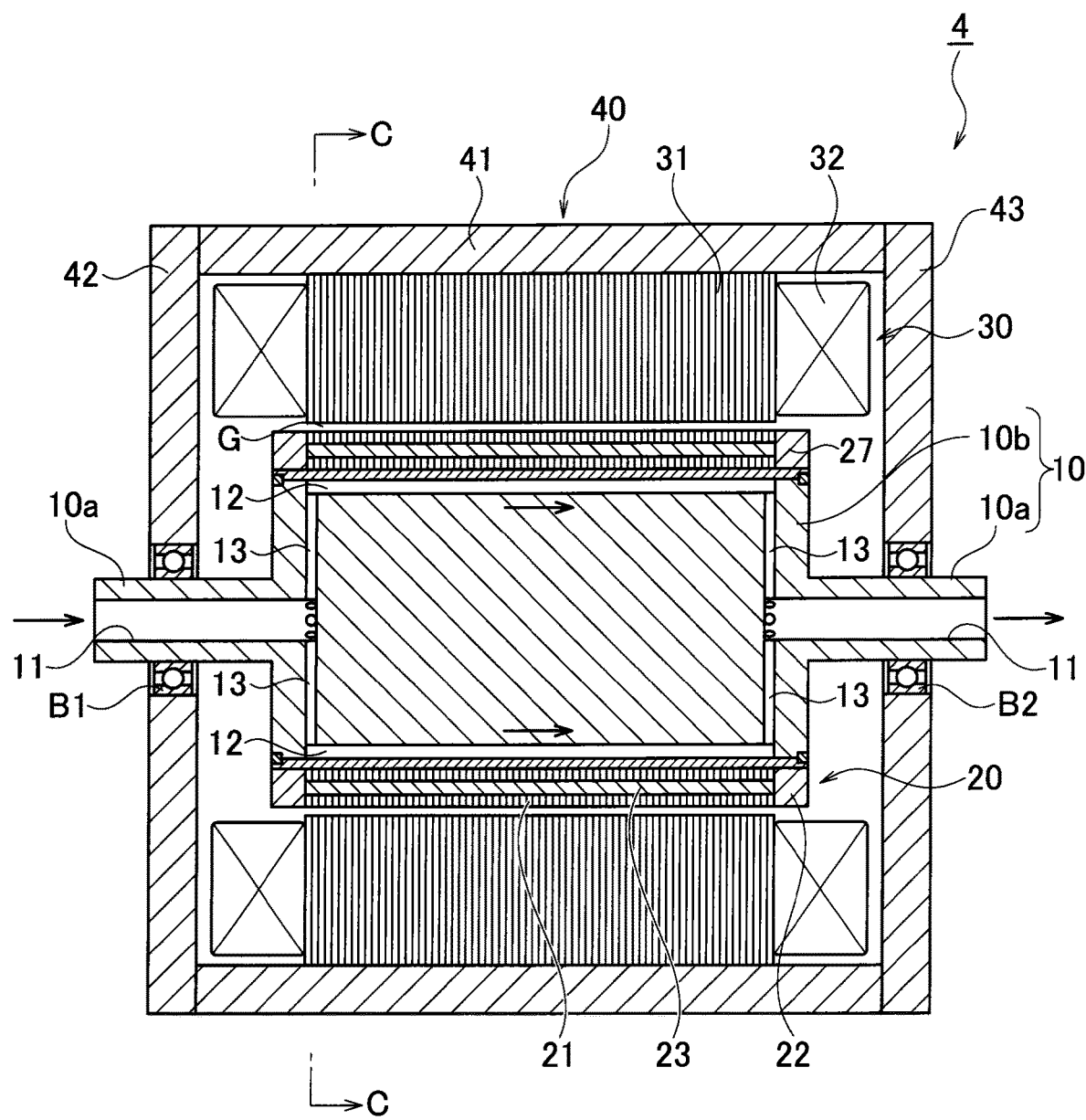
FIG. 8 is a sectional side view illustrating the structure of a motor, i.e., a rotary machine according to a fourth embodiment of the present invention.

A motor 4 according to the fourth embodiment illustrated in FIGS. 8 to 11 uses oil as a coolant, like the motor 3 of the third embodiment mentioned above, to cool the rotor 20 of any one of the motors 1 and 2 of the first and second embodiments. In particular, the fourth embodiment considers a case that an increase in the temperature of the rotor 20 at high rotation speed deteriorates the bonding strength of the adhesive that adheres the laminated magnetic steel sheets of the rotor core 21 together and prevents oil from leaking through the laminated magnetic steel sheets into the air gap G even if such a case occurs. In FIG. 8, the structure for cooling coil end parts 32a with oil is omitted. The structure of the motor 4 of the fourth embodiment will be explained in detail.

According to the present embodiment, a rotary shaft 10 includes a first shaft part (first rotary body part) 10a and a second shaft part (second rotary body part) 10b. The first shaft part 10a has a cylindrical shape and extends leftward in the axial direction from a central part of a left side face of the second shaft part 10b and rightward in the axial direction from a central part of a right side face of the second shaft part 10b. The second shaft part 10b has a cylindrical shape having a larger diameter than the first shaft part 10a.

In the rotary shaft 10, the second shaft part 10b is inserted through a central part of the rotor 20, and together with a sleeve (sleeve member) 27, is fixed to the rotor 20. A first side of the first shaft part 10a leftward protrudes from a housing 40 and a second side of the first shaft part 10a rightward protrudes from the housing 40. The first shaft part 10a is freely rotatably supported with bearings B1 and B2 arranged in the housing 40. Accordingly, the rotary shaft 10, rotor 20, and sleeve 27 integrally rotate around a rotation axis of the rotary shaft 10.

Figure 9:
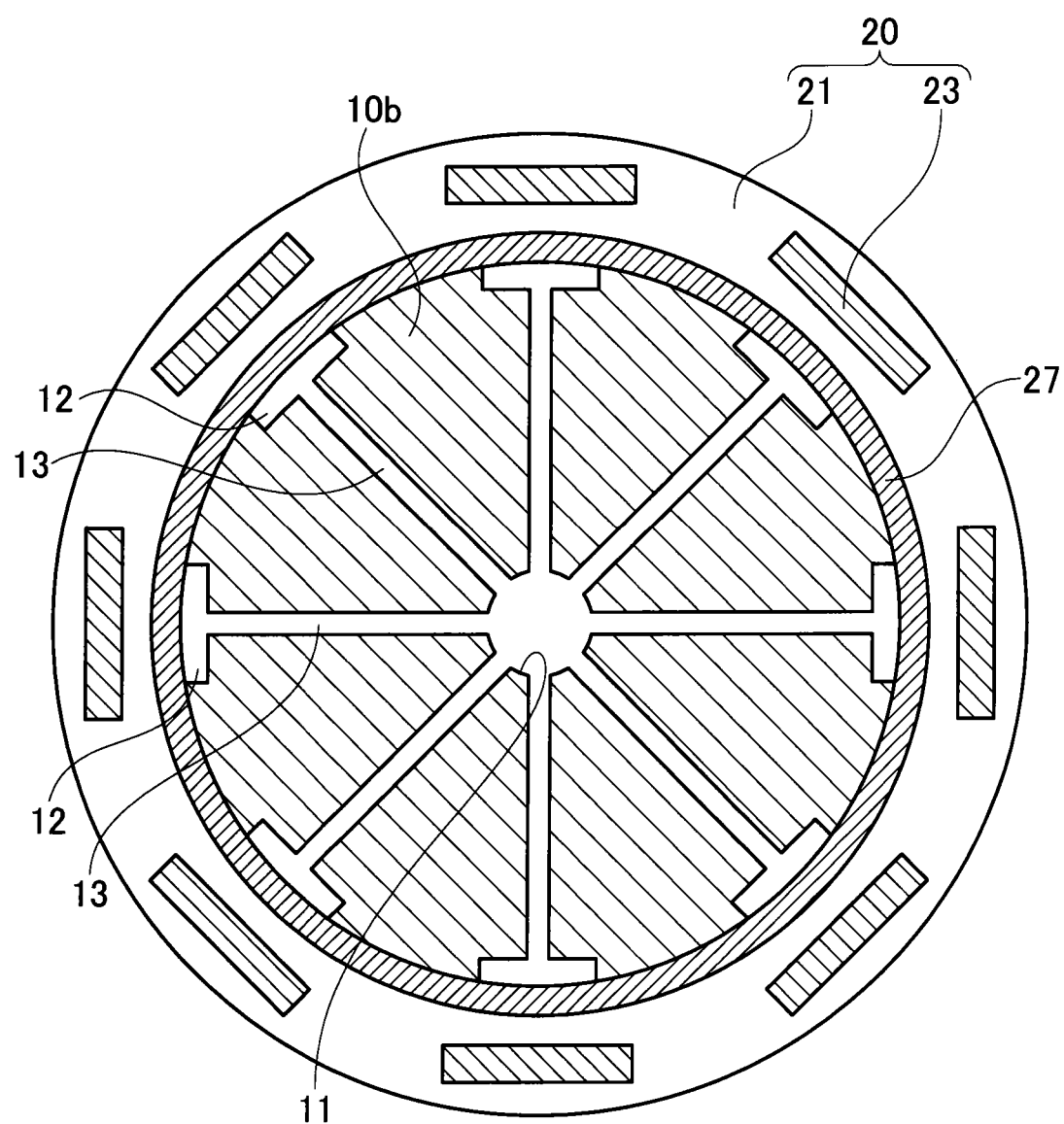
FIG. 9 is a sectional view taken along a line C-C of FIG. 8 and as seen from an arrowed direction.

Inside the first shaft part 10a of the rotary shaft 10, a coolant flow path (first flow path) 11 is formed along a center axis up to the inside of the second shaft part 10b. On an outer circumferential face of the second shaft part 10b of the rotary shaft 10, a groove (recess) 12 is formed as a coolant flow path to guide a coolant (such as cooling oil) to cool permanent magnets 23 arranged in the rotor 20. As illustrated in FIG. 9, this embodiment forms eight grooves 12 each having a rectangular sectional shape at regular intervals in a circumferential direction of the second shaft part 10b.

Figure 10:
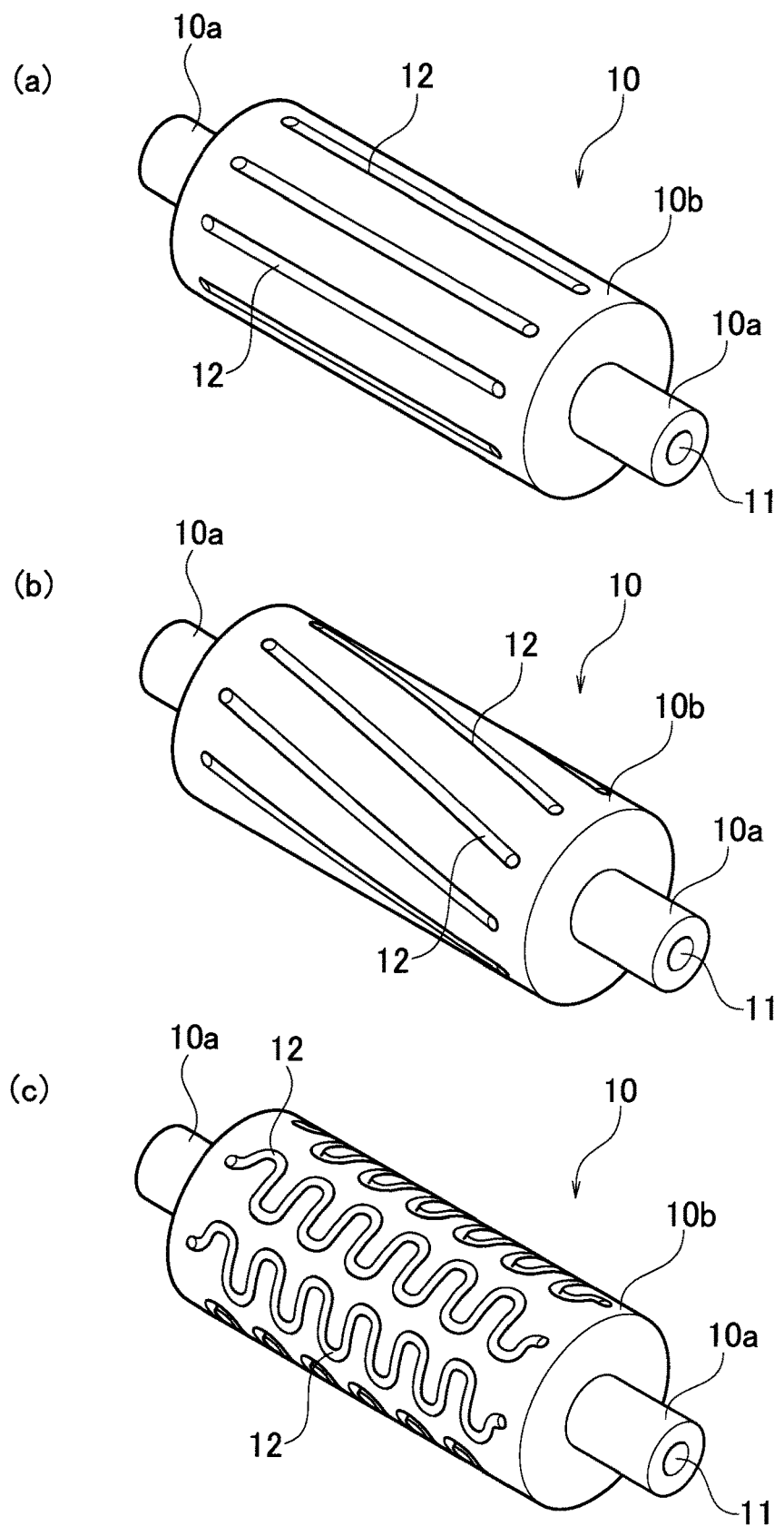
FIG. 10 is a perspective view of a rotary shaft of the motor, i.e., the rotary machine according to the fourth embodiment of the present invention.

FIG. 10 is a perspective view of the rotary shaft of the motor 4, i.e., the rotary machine according to the embodiment. As illustrated in FIG. 10(a), the grooves 12 are linearly formed in the axial direction on the second shaft part 10b of the rotary shaft 10. The grooves 12 are formed not to reach each axial end of the second shaft part 10b but they are formed to extend from the vicinity of one axial end of the second shaft part 10b up to the vicinity of the other axial end thereof. This is to at most prevent the coolant supplied to the grooves 12 serving as coolant flow paths from leaking outside through a gap between the rotary shaft 10 (second shaft part 10b) and the sleeve 27.

The grooves 12 formed in the outer circumferential face of the rotary shaft 10 may be spiral in the axial direction as illustrated in FIG. 10(b), or may be winding in the axial direction as illustrated in FIG. 10(c). When the grooves 12 are spiral as illustrated in FIG. 10(b), a circumferential temperature distribution of the rotor 20 will be equalized compared with the linearly formed grooves 12 illustrated in FIG. 10(a). When the grooves 12 are winding as illustrated in FIG. 10(c), the cooling efficiency of the rotor 20 will improve compared with the linearly formed grooves 12 illustrated in FIG. 10(a).

FIG. 11 is a view illustrating sectional shapes of grooves formed on the rotary shaft of the motor 4, i.e., the rotary machine according to the embodiment. As illustrated in FIG. 11(a), the embodiment forms the grooves 12 each into a rectangular sectional shape in the outer circumferential face of the second shaft part 10b of the rotary shaft 10. The sectional shape of each groove 12 may be an arc shape (a convex arc oriented toward the rotation axis) as illustrated in FIG. 11(b), or a triangular shape (with one vertex oriented toward the rotation axis) as illustrated in FIG. 11(c).

Instead of arranging a plurality of the thin and long axial grooves 12 in the circumferential direction of the second shaft part 10b as illustrated in FIGS. 11(a) to 11(c), the outer circumferential face of the second shaft part 10b may generally be recessed as illustrated in FIG. 11(d). Namely, the outer circumferential face of the second shaft part 10b except axial ends thereof may generally be hollowed to form a recess. Such a recess may be realized by forming, for example, a countless number of the linear grooves 12 of FIG. 11(a) in the circumferential direction.

Inside the second shaft part 10b of the rotary shaft 10, a communicating flow path (second flow path) 13 is formed to connect the coolant flow path 11 formed in the first shaft part 10a to each groove 12 formed in the outer circumferential face of the second shaft part 10b. As illustrated in FIG. 9, the communicating flow paths 13 are formed to extend from the coolant flow path 11 toward the grooves 12 in diametral directions of the second shaft part 10b (more precisely, in different eight directions).

As illustrated in FIG. 9, the rotary shaft 10 is positioned in a rotation direction of the rotor 20 so that the grooves 12 formed in the outer circumferential face of the second shaft part 10b come nearest to the permanent magnets 23 of the rotor 20, respectively. This is to increase the cooling efficiency of the rotor 20 by bringing the grooves 12 serving as the coolant flow paths for guiding a coolant as close to the permanent magnets 23 that are heat generating sources as possible.

The rotor 20 has a rotor core 21, end rings 22, and the permanent magnets 23, is attached together with the sleeve 27 to the rotary shaft 10, and is rotatable around the rotation axis of the rotary shaft 10. As illustrated in FIG. 8, the rotor core 21 is made by laminating magnetic steel sheets made of magnetic material with an adhesive and is an annular member with the rotary shaft 10 being passed through the central part of the rotor core 21.

The permanent magnet 23 is, for example, a rectangular parallelepiped magnet extending in the axial direction and is inserted into an insertion hole formed in the rotor core 21. The permanent magnets 23 are arranged at regular intervals along an outer circumferential face of the rotor core 21. According to the example illustrated in FIG. 9, eight permanent magnets 23 each having a rectangular sectional shape are arranged at regular intervals in a circumferential direction of the rotor core 21. This arrangement forms alternating magnetic fields along the outer circumferential face of the rotor core 21.

The end ring 22 is arranged at each axial side (in the laminated direction of the magnetic steel sheets) of the rotor core 21. The end rings 22 are annular members that axially hold the rotor core 21 from each side. An axial length of the rotor core 21 is set so that the length of the rotor core 21 including the end rings 22 arranged at each axial side of the rotor core 21 is equal to an axial length of the second shaft part 10b of the rotary shaft 10.

The sleeve 27 is an annular member arranged between the second shaft part 10b of the rotary shaft 10 and the rotor 20 and is made of, for example, the same material as the rotary shaft 10. An axial length of the sleeve 27 is set to be equal to the axial length of the second shaft part 10b of the rotary shaft 10. The sleeve 27 is fitted to the outer circumferential face of the second shaft part 10b of the rotary shaft 10 by, for example, shrinkage fitting. When the sleeve 27 is fitted to the outer circumferential face of the second shaft part 10b of the rotary shaft 10, the grooves 12 form coolant flow paths between the rotary shaft 10 and the sleeve 27.

The coolant guided into the grooves 12 serving as the coolant flow paths flows between the rotary shaft 10 (the second shaft part 10b) and the sleeve 27. Even if the rotor 20 is rotated at high speed under a condition that the bonding strength of the adhesive adhering the magnetic steel sheets of the rotor core 21 together is deteriorated due to a temperature increase of the motor 4, the coolant guided into the grooves 12 serving as the coolant flow paths is prevented from leaking. The rotor core 21 mentioned above is fitted to the outer circumferential face of the sleeve 27 by, for example, shrinkage fitting.

Since the sleeve 27 is fitted to the outer circumferential face of the second shaft part 10b by, for example, shrinkage fitting, the coolant guided into the grooves 12 almost causes no leakage. There will be leakage if the pressure of the coolant guided into the grooves 12 is high. To deal with this, at each axial end, the sleeve 27 is soldered or welded to the second shaft part 10b of the rotary shaft 10, or a sealing material such as an O-ring is arranged between the sleeve 27 and the second shaft part 10b of the rotary shaft 10, to seal the location.

Operation of the motor 4 with the above-mentioned structure will briefly be explained. When an external three-phase AC current is supplied to the motor 4, each phase current of the three-phase AC current is passed to a coil 32 (first to third coils) arranged in a stator 30, to form a rotating magnetic field in the rotation direction of the rotor 20 according to the supplied current. The rotor core 21 with alternating magnetic fields formed along the outer circumference thereof interacts with the rotating magnetic field, to create attractive force and repulsive force. This results in rotating the rotor 20 to rotate the rotary shaft 10, rotor 20, and sleeve 27 together, thereby transmitting torque of the rotary shaft 10 to the outside.

When the motor 4 is driven, a pump (not illustrated) supplies a coolant to the coolant flow path 11 at the first side of the first shaft part 10a of the rotary shaft 10. The coolant supplied to the coolant flow path 11 is guided through the communicating flow paths 13 at the first end side (left side) of the second shaft part 10b to the grooves 12 formed in the outer circumferential face of the second shaft part 10b. Between the rotary shaft 10 and the sleeve 27, the grooves 12 form coolant flow paths. Accordingly, the coolant guided into the grooves 12 cools the permanent magnets 23. These coolant flow paths are formed to be nearest to the permanent magnets 23 arranged in the rotor 20, and therefore, the rotor core 21 and permanent magnets 23 are efficiently cooled. The coolant passing through the grooves 12 serving as the coolant flow paths is guided through the communicating flow paths 13 at the second end side (right side) of the second shaft part 10b to the coolant flow path 11 at the second side of the first shaft part 10a and is discharged outside.

As mentioned above, this embodiment forms the grooves 12 serving as coolant flow paths in the outer circumferential face of the rotary shaft 10 and arranges the annular sleeve 27 between the rotary shaft 10 on which the grooves 12 are formed and the rotor 20, so that a coolant guided into the grooves 12 passes between the rotary shaft 10 and the sleeve 27. Even if the rotor 20 is rotated at high speed to deteriorate the bonding strength of the adhesive fixing the magnetic steel sheets of the rotor core 21 together due to a temperature increase of the motor 4, the present embodiment prevents the coolant guided into the grooves 12 from leaking.

The present embodiment forms the grooves 12 in the outer circumferential face of the second shaft part 10b of the rotary shaft 10 that is larger in diameter than the first shaft part 10a and arranges the sleeve 27 between the second shaft part 10b on which the grooves 12 are formed and the rotor 20, thereby positioning the coolant flow paths closest to the permanent magnets 23. Accordingly, the rotor 20 including the permanent magnets 23 is simply and efficiently cooled.

The number, length, and shape (including sectional shape) of the grooves 12 formed on the rotary shaft 10 are not limited to those of the above-mentioned embodiment. The rotation-direction (circumferential-direction) arrangements and positional relationships of the grooves 12 formed on the rotary shaft 10 and the permanent magnets 23 arranged in the rotor 20 are not limited to those of the above-mentioned embodiment. These arrangements and positional relationships are optional.

Although the above-mentioned embodiment has explained, as an example, the rotary shaft 10 that is made of the first shaft part 10a and second shaft part 10b (the first shaft part 10a and second shaft part 10b being integrated into one body), the present invention is applicable to a rotary shaft made of a first shaft part 10a and second shaft part 10b that are discrete members. For example, the rotary shaft 10 may be made of a cylindrical shaft member whose outer diameter is similar to that of the first shaft part 10a and a cylindrical auxiliary member that has an outer diameter similar to that of the second shaft part 10b and an inner diameter similar to that of the first shaft part 10a and is fixed to the cylindrical shaft member.

Fifth Embodiment

Figure 12:
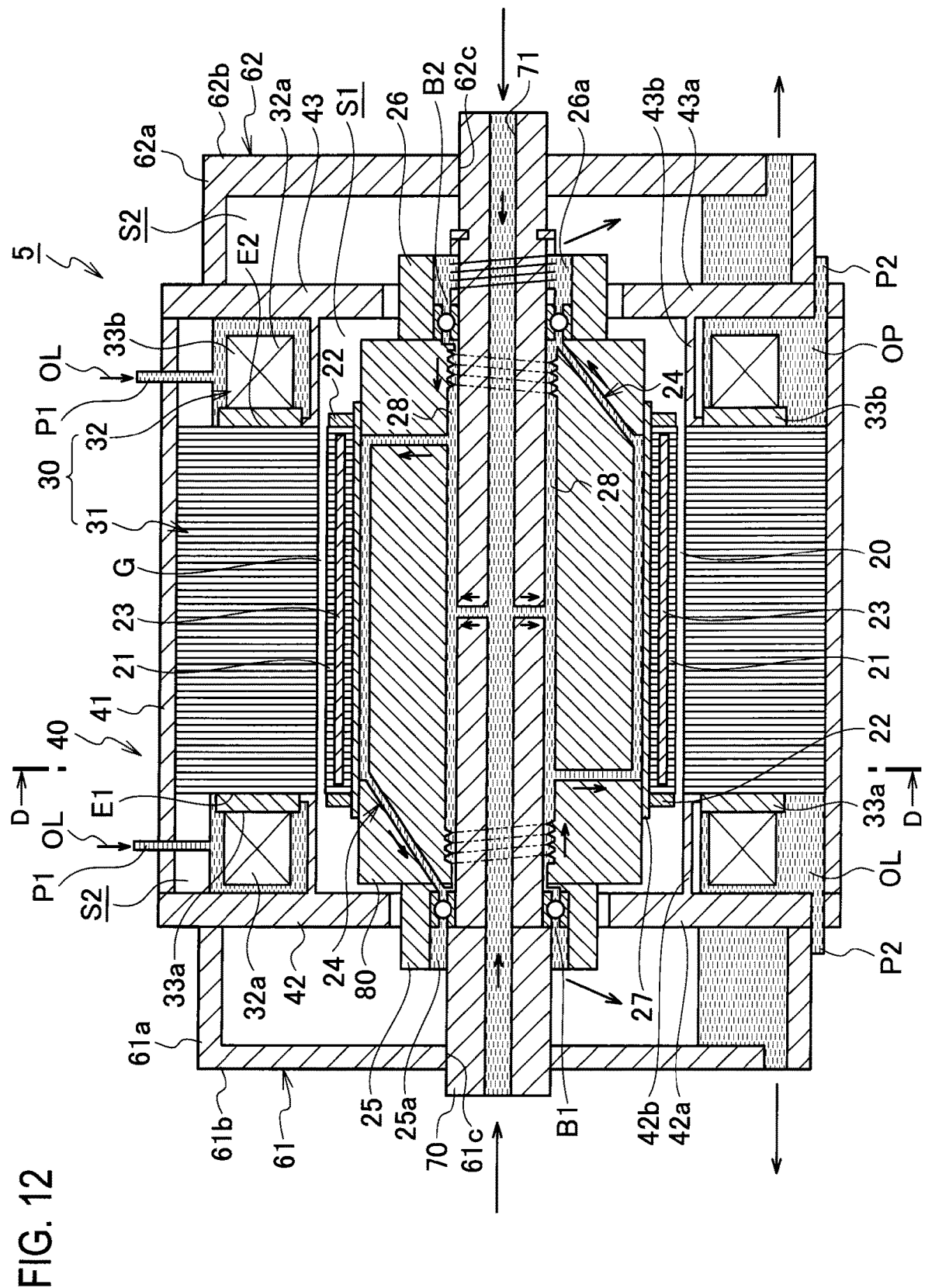
FIG. 12 is a sectional side view illustrating the structure of a motor, i.e., a rotary machine according to a fifth embodiment of the present invention.

FIG. 12 is a sectional side view illustrating the structure of a motor, i.e., a rotary machine according to the fifth embodiment of the present invention. According to the motor 5 of the fifth embodiment illustrated in FIG. 12, the outer and inner diameters of a cylindrical sleeve (annular sleeve member) 27 are larger than those of the third embodiment mentioned above, and for this, the diametral dimensions of a rotor core 21 and end rings 22 are reduced. The sleeve 27 is attached to an outer circumferential face of a cylindrical rotary body (second rotary body) 80 that is part of a rotor 20. On an outer circumferential face of the sleeve 27, there are attached the rotor core 21 and end rings 22.

According to the present embodiment, an oil flow path 24 of the rotor 20 is formed in the rotary body 80 as will be explained later, instead of in the rotor core 21 and end rings 22.

To each end face of the rotary body 80, rotary support members (first rotary bodies) 25 and 26 are attached with their center axis being aligned with each other. The rotary support members 25 and 26 form, with respect to a center shaft 70, annular gaps (first flow paths) 25a and 26a for guiding oil in the axial direction of the center shaft 70. The rotary body 80 has a larger diameter than the rotary support members 25 and 26.

In an outer circumferential face of the rotary body 80, there is formed a groove (recess) 12 that forms with an inner circumferential face of the sleeve 27 part of the oil flow path 24. According to the present embodiment, there are formed eight grooves 12 having a rectangular sectional shape at regular intervals in a circumferential direction of the rotary body 80 as illustrated in FIG. 13.

Inside the rotary body 80, the oil flow path (second flow path) 24 is formed to communicate with an annular gap 28 formed between an inner circumferential face of the rotary body 80 and an outer circumferential face of the center shaft 70. Corresponding to the permanent magnets 23 mentioned above, a plurality of the oil flow paths 24 are formed in a circumferential direction. As illustrated in FIG. 12, the oil flow paths 24 are formed in the outer circumferential face of the rotary body 80 in the vicinities of the permanent magnets 23. The oil flow paths 24 formed in the circumferential direction of the rotary body 80 alternate the directions of oil passing through them.

Figure 13:
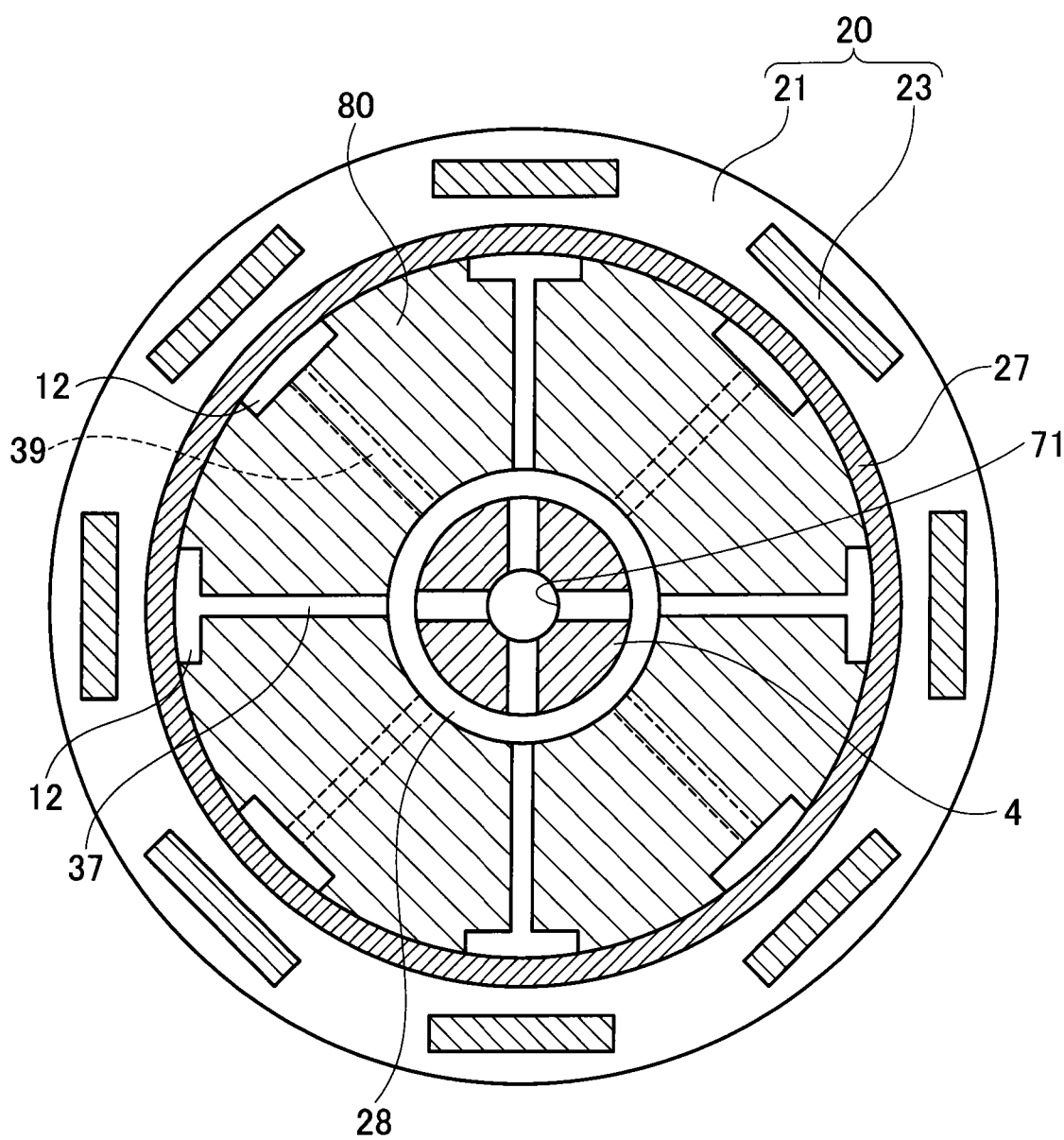
FIG. 13 is a sectional view taken along a line D-D of FIG. 12 and as seen from an arrowed direction.

The rotary body 80 is positioned in a rotation direction of the rotor core 21 so that, as illustrated in FIG. 13, the grooves 12 formed in the outer circumferential face of the rotary body 80 come closest to the permanent magnets 23 of the rotor core 21, respectively. This is to improve the cooling efficiency of the rotor 20 by bringing the grooves 12 forming part of the oil flow paths 24 for guiding oil as close to the permanent magnets 23, i.e., heat generating sources as possible.

The rotor 20 has the rotor core 21, the permanent magnets 23, and end rings 22, is attached together with the sleeve 27 to the rotary body 80, and is rotatable with the rotary body 80 around the center shaft 70. As illustrated in FIG. 12, the rotor core 21 is made by laminating magnetic steel sheets made of magnetic material with an adhesive and is an annular member wherein the rotary body 80 and sleeve 27 pass through a central part of the rotor core 21.

The end ring 22 is arranged at each axial side (in the laminated direction of the magnetic steel sheets) of the rotor core 21. The end rings 22 are annular members that axially hold the rotor core 21 from each side. An axial length of the rotor core 21 is set so that the length of the rotor core 21 including the end rings 22 arranged at each axial side of the rotor core 21 is equal to an axial length of the rotary body 80.

The sleeve 27 is an annular member arranged between the rotary body 80 and the rotor 20 and is made of, for example, the same material as the center shaft 70 and rotary body 80. An axial length of the sleeve 27 is set to be equal to an axial length of the rotary body 80 and is fitted to the outer circumferential face of the rotary body 80 by, for example, shrinkage fitting. When the sleeve 27 is fitted to the outer circumferential face of the rotary body 80, the grooves 12 form gap flow paths 35 between the rotary body 80 and the sleeve 27.

Oil guided into the grooves 12 forming part of the oil flow paths 24 flows between the rotary body 80 and the sleeve 27. Even if the rotor 20 is rotated at high speed to increase in a temperature of the motor 5 so that the bonding strength of the adhesive adhering the magnetic steel sheets of the rotor core 21 together is deteriorated, this configuration prevents the oil guided into the grooves 12 forming part of the oil flow paths 24 from leaking. The rotor core 21 mentioned above is fitted to the outer circumferential face of the sleeve 27 by, for example, shrinkage fitting.

Since the sleeve 27 is fitted to the outer circumferential face of the rotary body 80 by, for example, shrinkage fitting, the oil guided into the grooves 12 almost causes no leakage. There will be leakage if the pressure of the oil guided into the grooves 12 is high. To deal with this, at each axial end, the sleeve 27 is soldered or welded to the rotary body 80, or a sealing material such as an O-ring is arranged between the sleeve 27 and the rotary body 80, to seal the location.

Operation of the motor 5 with the above-mentioned structure will briefly be explained. When the motor 5 is driven, a pump (not illustrated) supplies oil from an end opening of the center shaft 70 into an oil introducing flow path 71. The introduced oil flows from the oil introducing flow path 71 to the gap 28 on the outer circumferential side of the center shaft 70, passes the gap 28 in an axial outward direction, and flows into the oil flow paths 24.

The oil flowed into the oil flow paths 24 is guided into the grooves 12 formed in the outer circumferential face of the rotary body 80. Between the rotary body 80 and the sleeve 27, the grooves 12 form the flow paths, and therefore, the oil guided into the grooves 12 cools the permanent magnets 23. The grooves 12 are arranged to be closest to the permanent magnets 23 incorporated in the rotor core 21, and therefore, the rotor core 21 and permanent magnets 23 are efficiently cooled. The oil passing through the flow paths formed by the grooves 12 passes through the oil flow paths 24 and the internal spaces of bearings B1 and B2 and reaches openings of the rotary support members 25 and 26. Thereafter, the oil is discharged into spaces between left and right sidewall members 42 and 43 of a housing 40 and left and right sidewall members 61b and 62b of outer housings 61 and 62.

As mentioned above, this embodiment forms the grooves 12 in the outer circumferential face of the rotary body 80 of the rotor 20 to form part of the oil flow paths 24, and between the rotary body 80 on which the grooves 12 are formed and the rotor core 21, arranges the annular sleeve 27, so that oil introduced into the grooves 12 may pass between the rotary body 80 and the sleeve 27. Even if the rotor 20 is rotated at high speed to deteriorate the bonding strength of the adhesive that adheres the magnetic steel sheets of the rotor core 21 together due to a temperature increase of the motor 5, this configuration prevents the coolant guided into the grooves 12 from leaking.

This embodiment forms the grooves 12 in the outer circumferential face of the rotary body 80 that is larger in diameter than the rotary support members 25 and 26 and arranges the sleeve 27 between the rotary body 80 on which the grooves 12 are formed and the rotor core 21, thereby positioning the coolant flow paths closest to the permanent magnets 23. Accordingly, the rotor 20 incorporating the permanent magnets 23 is simply and efficiently cooled.

The number, length, and shape (including sectional shape) of the grooves 12 formed on the rotary body 80 are not limited to those mentioned above. The rotation-direction (circumferential-direction) arrangements and positional relationships of the grooves 12 formed in the outer circumferential face of the rotary body 80 and the permanent magnets 23 arranged in the rotor core 21 are not limited to those mentioned above. These arrangements and positional relationships are optional.

Although the above-mentioned embodiment integrates the rotary support members 25 and 26 and the rotary body 80 into one body, the rotary support members 25 and 26 and the rotary body 80 may be discrete members.

Figure 14:
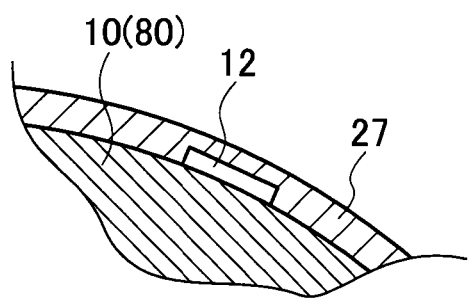
FIG. 14 is a sectional view illustrating a sectional shape of a groove formed on a sleeve of FIG. 9 or 13.
Figure 15:
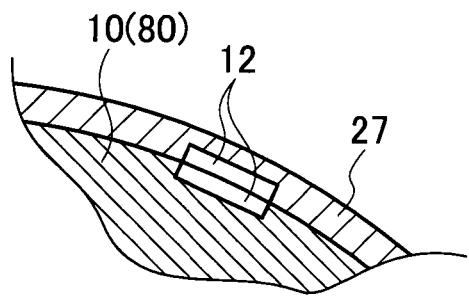
FIG. 15 is a sectional view illustrating a sectional shape of a groove formed on the rotary body and sleeve of FIG. 9 or 13.

According to the fourth embodiment of FIGS. 8 to 11, the grooves 12 that are recesses to form coolant flow paths are formed in the outer circumferential face of the rotary shaft 10. According to the fifth embodiment of FIGS. 12 and 13, the grooves 12 that are recesses to form part of the oil flow paths 24 are formed in the outer circumferential face of the rotary body 80. The grooves 12 may be formed in the inner circumferential face of the sleeve 27 as illustrated in FIG. 14, or may be formed in both the outer circumferential face of the rotary shaft 10 or the rotary body 80 and the inner circumferential face of the sleeve 27.

INDUSTRIAL APPLICABILITY

The present invention is applicable not only to motors of electric vehicles but also generally and widely to rotary machines that convert electric power into torque, or rotary machines such as generators that convert torque into electric power.

EXPLANATION OF REFERENCE NUMERALS 1, 2, 3, 4, 5: Motor
10: Rotary shaft (Rotor shaft)
10a: First shaft part (First rotary body part)
10b: Second shaft part (Second rotary body part)
11: Coolant flow path
12: Groove
13: Communicating flow path
20: Rotor
21: Rotor core 23: Permanent magnet
24: Oil flow path (Coolant flow path, Second flow path)
25, 26: Rotary support member (First rotary body part)
25a, 26a: Gap (First flow path)
27: Sleeve (Sleeve member)
30: Stator
31: Stator core
32: Coil
32a: Coil end part
33a, 33b: Mold member
33c: Mold member
42b, 43b: Partition part (Partition member)
51: Mold member
51a: Annular part
51b: Protrusion
52b, 53c: Partition part (Partition member)
70: Center shaft (Rotor shaft)
80: Rotary body (Second rotary body part)
P1: Oil supply port (Coolant supply port)
S1: First space
S2: Second space

The invention claimed is:

1. A rotary machine comprising:
a rotor rotatable around a center axis of a rotor shaft;
a stator having a stator core arranged around the rotor and a coil attached to the stator core so that a coil end part protrudes from each end of the stator core;
a mold member formed at each end of the stator core and configured to cover only around each of a base part of the coil end part;
a partition member attached in contact with the mold member and configured to separate a first space with the rotor arranged therein from a second space with the coil end part arranged therein, wherein:
the mold member formed at a first end of the stator core has an annular shape along the first end of the stator core,
the mold member formed at a second end of the stator core has an annular part formed along the second end of the stator core and a cylindrical protrusion protruding from the annular part and extending in a rotor shaft direction,
a housing which accommodates the rotor and the stator and forms an external shape of the rotary machine, the housing including a body member and a sidewall member,
the stator is fixed to an inner circumferential face of the body member,
a cylindrical partition part protrudes in an axial direction from an interior surface of the sidewall member, and
the cylindrical protrusion is in contact and surrounds the cylindrical partition part.

2. The rotary machine according to claim 1, further comprising a mold member formed inside the stator core and configured to fill a gap in a slot formed in the stator core to accommodate the coil.

3. The rotary machine according to claim 2, wherein
the mold member formed at each end of the stator core and the mold member formed inside the stator core are made of materials having different thermal conductivities, respectively.

4. The rotary machine according to claim 1, further comprising a coolant supply port configured to supply a coolant from the outside to the coil end part arranged in the second space.

5. The rotary machine according to claim 4, wherein
the coolant supply port is arranged at a plurality of locations in a rotation direction of the rotor above the coil end part.

6. The rotary machine according to claim 1, wherein
an end of the partition member is fitted to, attached to, brought in contact with, or engaged with the whole of an inner circumference of the mold member, thereby separating the first space from the second space.

7. The rotary machine according to claim 1, wherein
the rotor has a rotary body rotatable around the center axis of the rotor shaft and a sleeve member attached to an outer circumferential face of the rotary body,
a rotor core formed by laminating a plurality of magnetic steel sheets is attached to an outer circumferential face of the sleeve member, and
a recess serving as a coolant flow path for guiding a coolant is formed in at least one of the outer circumferential face of the rotary body and an inner circumferential face of the sleeve member.

8. The rotary machine according to claim 7, wherein
the rotary body has a first rotary body that has a first flow path for axially guiding the coolant and a second rotary body that has a larger diameter than the first rotary body and contains an internal second flow path to connect the first flow path to the coolant flow path and the recess is formed in an outer circumferential face of the second rotary body.

9. The rotary machine according to claim 7, wherein
the recess is formed in a same number as a number of permanent magnets arranged in the rotor.

10. The rotary machine according to claim 9, wherein
positions of the rotary body and the sleeve member with respect to the rotor in a rotation direction of the rotor are set so that the recesses come closest to the permanent magnets, respectively.

11. The rotary machine according to claim 1, wherein a front end of the partition member is in contact with the mold member, and an outer diameter of the partition member k substantially equal to an inner diameter of the stator core.

12. The rotary machine according to claim 1, wherein an end of the partition member in contact with the mold member is tapered.

13. The rotary machine according to claim 1, wherein an axial length of the mold member formed at the second end of the stator core is less than an axial length of the mold member formed at the first end of the stator core.

* * * * *